US012347304B2

(12) United States Patent
Kappus

(10) Patent No.: US 12,347,304 B2
(45) Date of Patent: Jul. 1, 2025

(54) MINIMIZING UNWANTED RESPONSES IN HAPTIC SYSTEMS

(71) Applicant: ULTRAHAPTICS IP LTD, Bristol (GB)

(72) Inventor: Brian Kappus, Mountain View, CA (US)

(73) Assignee: ULTRAHAPTICS IP LTD, Bristol (GB)

( * ) Notice: Subject to any disclaimer, the term of this patent is extended or adjusted under 35 U.S.C. 154(b) by 217 days.

(21) Appl. No.: 18/322,779

(22) Filed: May 24, 2023

(65) Prior Publication Data

US 2023/0298444 A1 Sep. 21, 2023

Related U.S. Application Data

(62) Division of application No. 16/229,091, filed on Dec. 21, 2018, now Pat. No. 11,704,983.

(60) Provisional application No. 62/777,770, filed on Dec. 11, 2018, provisional application No. 62/609,429, filed on Dec. 22, 2017.

(51) Int. Cl.

*G08B 6/00* (2006.01)
*G10K 11/34* (2006.01)
*H04R 1/40* (2006.01)

(52) U.S. Cl.

CPC .............. *G08B 6/00* (2013.01); *G10K 11/346* (2013.01); *H04R 1/40* (2013.01)

(58) Field of Classification Search

CPC ........... G08B 6/00; G10K 11/346; H04R 1/40
USPC .......................................................... 367/140
See application file for complete search history.

(56) References Cited

U.S. PATENT DOCUMENTS

| | | | |
|---|---|---|---|
| 1,218,921 | A | 8/1980 | Berge |
| 4,760,525 | A | 7/1988 | Webb |
| 4,771,205 | A | 9/1988 | Mequio |
| 4,881,212 | A | 11/1989 | Takeuchi |
| 5,122,993 | A | 6/1992 | Hikita |
| 5,226,000 | A | 7/1993 | Moses |
| 5,235,986 | A | 8/1993 | Maslak |
| 5,243,344 | A | 9/1993 | Koulopoulos |
| 5,329,682 | A | 7/1994 | Thurn |

(Continued)

FOREIGN PATENT DOCUMENTS

| | | | |
|---|---|---|---|
| CA | 2470115 | A1 | 6/2003 |
| CA | 2909804 | A1 | 11/2014 |

(Continued)

OTHER PUBLICATIONS

Office Action (Non-Final Rejection) dated Dec. 6, 2022 for U.S. Appl. No. 17/409,783 (pp. 1-7).

(Continued)

*Primary Examiner* — Jack K Wang
(74) *Attorney, Agent, or Firm* — Koffsky Schwalb LLC; Mark I. Koffsky

(57) ABSTRACT

Disclosed are methods to manipulate a given parametrized haptic curve in order to yield a smooth phase function for each acoustic transducer which minimizes unwanted parametric audio. Further, the impulse response of a haptic system describes the behavior of the system over time and can be convolved with a given input to simulate a response to that input. To produce a specific response, a deconvolution with the impulse response is necessary to generate an input.

11 Claims, 19 Drawing Sheets

(56) References Cited

U.S. PATENT DOCUMENTS 5,371,834 A 12/1994 Tawel
5,422,431 A 6/1995 Tetsuji
5,426,388 A 6/1995 Flora
5,477,736 A 12/1995 Lorraine
5,511,296 A 4/1996 Dias
5,729,694 A 3/1998 Holzrichter
5,859,915 A 1/1999 Norris
6,029,518 A 2/2000 Oeftering
6,193,936 B1 2/2001 Gardner
6,216,538 B1 4/2001 Yasuda
6,436,051 B1 8/2002 Morris
6,503,204 B1 1/2003 Sumanaweera
6,533,455 B2 3/2003 Graumann
6,647,359 B1 11/2003 Verplank
6,771,294 B1 8/2004 Pulli
6,772,490 B2 8/2004 Toda
6,800,987 B2 10/2004 Toda
7,107,159 B2 9/2006 German
7,109,789 B2 9/2006 Spencer
7,154,928 B2 12/2006 Sandstrom
7,182,726 B2 2/2007 Williams
7,225,404 B1 5/2007 Zilles
7,284,027 B2 10/2007 Jennings, III
7,345,600 B1 3/2008 Fedigan
7,487,662 B2 2/2009 Schabron
7,497,662 B2 3/2009 Mollmann
7,577,260 B1 8/2009 Hooley
7,692,661 B2 4/2010 Cook
RE42,192 E 3/2011 Schabron
7,966,134 B2 6/2011 German
8,000,481 B2 8/2011 Nishikawa
8,123,502 B2 2/2012 Blakey
8,269,168 B1 9/2012 Axelrod
8,279,193 B1 10/2012 Birnbaum
8,351,646 B2 1/2013 Fujimura
8,369,973 B2 2/2013 Risbo
8,594,350 B2 11/2013 Hooley
8,607,922 B1 12/2013 Werner
8,782,109 B2 7/2014 Tsutsui
8,823,674 B2 9/2014 Birnbaum
8,833,510 B2 9/2014 Koh
8,884,927 B1 11/2014 Cheatham, III
9,208,664 B1 12/2015 Peters
9,267,735 B2 2/2016 Funayama
9,421,291 B2 8/2016 Robert
9,612,658 B2 4/2017 Subramanian
9,662,680 B2 5/2017 Yamamoto
9,667,173 B1 5/2017 Kappus
9,786,092 B2 10/2017 Santhanam
9,795,446 B2 10/2017 Dimaio
9,816,757 B1 11/2017 Zielinski
9,841,819 B2 12/2017 Carter
9,863,699 B2 1/2018 Corbin, III
9,898,089 B2 2/2018 Subramanian
9,936,908 B1 4/2018 Acosta
9,945,818 B2 4/2018 Ganti
9,958,943 B2 5/2018 Long
9,977,120 B2 5/2018 Carter
10,101,811 B2 10/2018 Carter
10,101,814 B2 10/2018 Carter
10,133,353 B2 11/2018 Eid
10,140,776 B2 11/2018 Schwarz
10,146,353 B1 12/2018 Smith
10,168,782 B1 1/2019 Tchon
10,268,275 B2 4/2019 Carter
10,281,567 B2 5/2019 Carter
10,318,008 B2 6/2019 Sinha
10,383,694 B1 8/2019 Venkataraman
10,444,842 B2 10/2019 Long
10,469,973 B2 11/2019 Hayashi
10,496,175 B2 12/2019 Long
10,497,358 B2 12/2019 Tester
10,510,357 B2 12/2019 Kovesi
10,520,252 B2 12/2019 Momen
10,523,159 B2 12/2019 Megretski
10,531,212 B2 1/2020 Long
10,535,174 B1 1/2020 Rigiroli
10,559,295 B1 * 2/2020 Abel ....................... H04S 7/305
10,569,300 B2 2/2020 Hoshi
10,593,101 B1 3/2020 Han
10,599,434 B1 3/2020 Barrett
10,657,704 B1 5/2020 Han
10,685,538 B2 6/2020 Carter
10,755,538 B2 8/2020 Carter
10,818,162 B2 10/2020 Carter
10,911,861 B2 2/2021 Buckland
10,915,177 B2 2/2021 Carter
10,921,890 B2 2/2021 Subramanian
10,930,123 B2 2/2021 Carter
10,943,578 B2 3/2021 Long
10,991,074 B2 4/2021 Bousmalis
11,048,329 B1 6/2021 Lee
11,080,874 B1 8/2021 Bardagjy
11,098,951 B2 8/2021 Kappus
11,106,273 B2 8/2021 Hazra
11,113,860 B2 9/2021 Rigiroli
11,125,866 B2 9/2021 Sumi
11,169,610 B2 11/2021 Sarafianou
11,189,140 B2 11/2021 Long
11,204,644 B2 12/2021 Long
11,276,281 B2 3/2022 Carter
11,334,165 B1 5/2022 Clements
11,350,909 B2 6/2022 Maresca
11,475,247 B2 10/2022 Nikolenko
11,531,395 B2 12/2022 Kappus
11,543,507 B2 1/2023 Carter
11,550,395 B2 1/2023 Beattie
11,550,432 B2 1/2023 Carter
11,553,295 B2 1/2023 Kappus
11,669,661 B2 6/2023 Mirzendehdel
11,693,113 B2 7/2023 Bachmann
11,704,983 B2 7/2023 Long
11,714,492 B2 8/2023 Carter
11,715,453 B2 8/2023 Kappus
11,727,790 B2 8/2023 Carter
11,740,018 B2 8/2023 Kappus
11,742,870 B2 8/2023 Long
11,768,540 B2 9/2023 Long
11,816,267 B2 11/2023 Kappus
11,830,351 B2 11/2023 Carter
11,830,352 B1 11/2023 Agrawal
11,842,517 B2 12/2023 Lyons
11,886,639 B2 1/2024 Brown
11,921,928 B2 3/2024 Iodice
11,955,109 B2 4/2024 Long
12,100,288 B2 9/2024 Carter
12,158,522 B2 12/2024 Iodice
2001/0007591 A1 7/2001 Pompei
2001/0033124 A1 10/2001 Norris
2001/0053204 A1 12/2001 Navab
2002/0149570 A1 10/2002 Knowles
2003/0024317 A1 2/2003 Miller
2003/0144032 A1 7/2003 Brunner
2003/0182647 A1 9/2003 Radeskog
2004/0005715 A1 1/2004 Schabron
2004/0014434 A1 1/2004 Haardt
2004/0052387 A1 3/2004 Norris
2004/0091119 A1 5/2004 Duraiswami
2004/0210158 A1 10/2004 Organ
2004/0226378 A1 11/2004 Oda
2004/0264707 A1 12/2004 Yang
2005/0052714 A1 3/2005 Klug
2005/0056851 A1 3/2005 Althaus
2005/0148874 A1 7/2005 Brock-Fisher
2005/0175193 A1 * 8/2005 Karjalainen ............ H04R 3/04
381/103
2005/0212760 A1 9/2005 Marvit
2005/0226437 A1 10/2005 Pellegrini
2005/0267695 A1 12/2005 German
2005/0273483 A1 12/2005 Dent
2006/0085049 A1 4/2006 Cory
2006/0090955 A1 5/2006 Cardas
2006/0091301 A1 5/2006 Trisnadi
2006/0164428 A1 7/2006 Cook

(56) References Cited

U.S. PATENT DOCUMENTS

2007/0036492 A1 2/2007 Lee
2007/0056374 A1 3/2007 Andrews
2007/0094317 A1 4/2007 Wang
2007/0177681 A1 8/2007 Choi
2007/0214462 A1 9/2007 Boillot
2007/0216711 A1 9/2007 Smith
2007/0236450 A1 10/2007 Colgate
2007/0263741 A1 11/2007 Erving
2008/0012647 A1 1/2008 Risbo
2008/0027686 A1 1/2008 Mollmann
2008/0084789 A1 4/2008 Altman
2008/0130906 A1 6/2008 Goldstein
2008/0152191 A1 6/2008 Fujimura
2008/0226088 A1 9/2008 Aarts
2008/0273723 A1 11/2008 Hartung
2008/0291198 A1 11/2008 Chun
2008/0300055 A1 12/2008 Lutnick
2009/0093724 A1 4/2009 Pernot
2009/0116660 A1 5/2009 Croft, III
2009/0232684 A1 9/2009 Hirata
2009/0251421 A1 10/2009 Bloebaum
2009/0319065 A1 12/2009 Risbo
2010/0013613 A1 1/2010 Weston
2010/0016727 A1 1/2010 Rosenberg
2010/0030076 A1 2/2010 Vortman
2010/0044120 A1 2/2010 Richter
2010/0066512 A1 3/2010 Rank
2010/0085168 A1 4/2010 Kyung
2010/0103246 A1 4/2010 Schwerdtner
2010/0109481 A1 5/2010 Buccafusca
2010/0199232 A1 8/2010 Mistry
2010/0231508 A1 9/2010 Cruz-Hernandez
2010/0262008 A1 10/2010 Roundhill
2010/0302015 A1 12/2010 Kipman
2010/0321216 A1 12/2010 Jonsson
2011/0006888 A1 1/2011 Bae
2011/0010958 A1 1/2011 Clark
2011/0051554 A1 3/2011 Varray
2011/0066032 A1 3/2011 Shuki
2011/0134225 A1 6/2011 Saint-Pierre
2011/0199342 A1 8/2011 Vartanian
2011/0310028 A1 12/2011 Camp, Jr.
2012/0031193 A1* 2/2012 Adams .................... G01L 25/00
73/804
2012/0057733 A1 3/2012 Morii
2012/0063628 A1 3/2012 Rizzello
2012/0066280 A1 3/2012 Tsutsui
2012/0113223 A1 5/2012 Hilliges
2012/0223880 A1 9/2012 Birnbaum
2012/0229400 A1 9/2012 Birnbaum
2012/0229401 A1 9/2012 Birnbaum
2012/0236689 A1 9/2012 Brown
2012/0243374 A1 9/2012 Dahl
2012/0249409 A1 10/2012 Toney
2012/0249474 A1 10/2012 Pratt
2012/0299853 A1 11/2012 Dagar
2012/0307649 A1 12/2012 Park
2012/0315605 A1 12/2012 Cho
2013/0035582 A1 2/2013 Radulescu
2013/0079621 A1 3/2013 Shoham
2013/0094678 A1 4/2013 Scholte
2013/0100008 A1 4/2013 Marti
2013/0101141 A1 4/2013 Mcelveen
2013/0173658 A1 7/2013 Adelman
2013/0271397 A1 10/2013 Macdougall
2013/0331705 A1 12/2013 Fraser
2014/0027201 A1 1/2014 Islam
2014/0104274 A1 4/2014 Hilliges
2014/0139071 A1 5/2014 Yamamoto
2014/0168091 A1 6/2014 Jones
2014/0201666 A1 7/2014 Bedikian
2014/0204002 A1 7/2014 Bennet
2014/0265572 A1 9/2014 Siedenburg
2014/0267065 A1 9/2014 Levesque
2014/0269207 A1 9/2014 Baym
2014/0269208 A1 9/2014 Baym
2014/0269214 A1 9/2014 Baym
2014/0270305 A1 9/2014 Baym
2014/0306891 A1 10/2014 Latta
2014/0320436 A1 10/2014 Modarres
2014/0361988 A1 12/2014 Katz
2014/0369514 A1 12/2014 Baym
2015/0002477 A1 1/2015 Cheatham, III
2015/0002517 A1 1/2015 Lee
2015/0005039 A1 1/2015 Liu
2015/0006645 A1 1/2015 Oh
2015/0007025 A1 1/2015 Sassi
2015/0013023 A1 1/2015 Wang
2015/0019299 A1 1/2015 Harvey
2015/0022466 A1 1/2015 Levesque
2015/0029155 A1 1/2015 Lee
2015/0066445 A1 3/2015 Lin
2015/0070147 A1 3/2015 Cruz-Hernandez
2015/0070245 A1 3/2015 Han
2015/0078136 A1 3/2015 Sun
2015/0081110 A1 3/2015 Houston
2015/0084929 A1 3/2015 Lee
2015/0110310 A1 4/2015 Minnaar
2015/0130323 A1 5/2015 Harris
2015/0168205 A1 6/2015 Lee
2015/0187134 A1 7/2015 Baecher
2015/0192995 A1 7/2015 Subramanian
2015/0209564 A1 7/2015 Lewin
2015/0215703 A1* 7/2015 Paumier ................... H03G 3/00
381/103
2015/0220199 A1 8/2015 Wang
2015/0226537 A1 8/2015 Schorre
2015/0226831 A1 8/2015 Nakamura
2015/0241393 A1 8/2015 Ganti
2015/0248787 A1 9/2015 Abovitz
2015/0258431 A1 9/2015 Stafford
2015/0277610 A1 10/2015 Kim
2015/0293592 A1 10/2015 Cheong
2015/0304789 A1 10/2015 Babayoff
2015/0309629 A1 10/2015 Amariutei
2015/0319024 A1* 11/2015 Bogdan ............... H04L 27/2647
375/340
2015/0323667 A1 11/2015 Przybyla
2015/0331576 A1 11/2015 Piya
2015/0332075 A1 11/2015 Burch
2016/0019762 A1 1/2016 Levesque
2016/0019879 A1 1/2016 Daley
2016/0026253 A1 1/2016 Bradski
2016/0044417 A1 2/2016 Clemen, Jr.
2016/0124080 A1 5/2016 Carter
2016/0138986 A1 5/2016 Carlin
2016/0175701 A1 6/2016 Froy
2016/0175709 A1 6/2016 Idris
2016/0189702 A1 6/2016 Blanc
2016/0242724 A1 8/2016 Lavallee
2016/0246374 A1 8/2016 Carter
2016/0249150 A1 8/2016 Carter
2016/0291716 A1 10/2016 Boser
2016/0306423 A1 10/2016 Uttermann
2016/0320843 A1 11/2016 Long
2016/0339132 A1 11/2016 Cosman
2016/0358477 A1 12/2016 Ansari
2016/0374562 A1 12/2016 Vertikov
2017/0002839 A1 1/2017 Bukland
2017/0004819 A1 1/2017 Ochiai
2017/0018171 A1 1/2017 Carter
2017/0024921 A1 1/2017 Beeler
2017/0052148 A1 2/2017 Estevez
2017/0123487 A1 5/2017 Hazra
2017/0123499 A1 5/2017 Eid
2017/0140552 A1 5/2017 Woo
2017/0144190 A1 5/2017 Hoshi
2017/0153707 A1 6/2017 Subramanian
2017/0168586 A1 6/2017 Sinha
2017/0181725 A1 6/2017 Han
2017/0193768 A1 7/2017 Long
2017/0193823 A1 7/2017 Jiang
2017/0211022 A1 7/2017 Reinke
2017/0236506 A1 8/2017 Przybyla

(56) References Cited

U.S. PATENT DOCUMENTS

| | | | |
|---|---|---|---|
| 2017/0249932 | A1 | 8/2017 | Maxwell |
| 2017/0270356 | A1 | 9/2017 | Sills |
| 2017/0279951 | A1 | 9/2017 | Hwang |
| 2017/0336860 | A1 | 11/2017 | Smoot |
| 2017/0366908 | A1 | 12/2017 | Long |
| 2018/0018787 | A1 | 1/2018 | Giancola |
| 2018/0035891 | A1 | 2/2018 | Van Soest |
| 2018/0039333 | A1 | 2/2018 | Carter |
| 2018/0047259 | A1 | 2/2018 | Carter |
| 2018/0074580 | A1 | 3/2018 | Hardee |
| 2018/0081439 | A1 | 3/2018 | Daniels |
| 2018/0101234 | A1 | 4/2018 | Carter |
| 2018/0139557 | A1 | 5/2018 | Ochiai |
| 2018/0146306 | A1 | 5/2018 | Benattar |
| 2018/0151035 | A1 | 5/2018 | Maalouf |
| 2018/0166063 | A1 | 6/2018 | Long |
| 2018/0181203 | A1 | 6/2018 | Subramanian |
| 2018/0182372 | A1 | 6/2018 | Tester |
| 2018/0183372 | A1* | 6/2018 | Li .......................... G06F 3/016 |
| 2018/0190007 | A1 | 7/2018 | Panteleev |
| 2018/0246576 | A1 | 8/2018 | Long |
| 2018/0253627 | A1 | 9/2018 | Baradel |
| 2018/0263708 | A1 | 9/2018 | Kim |
| 2018/0267156 | A1 | 9/2018 | Carter |
| 2018/0271494 | A1 | 9/2018 | Cuscuna |
| 2018/0304310 | A1 | 10/2018 | Long |
| 2018/0309515 | A1 | 10/2018 | Murakowski |
| 2018/0310111 | A1 | 10/2018 | Kappus |
| 2018/0350339 | A1 | 12/2018 | Macours |
| 2018/0361174 | A1 | 12/2018 | Radulescu |
| 2019/0001129 | A1 | 1/2019 | Rosenbluth |
| 2019/0038496 | A1 | 2/2019 | Levesque |
| 2019/0091565 | A1 | 3/2019 | Nelson |
| 2019/0163275 | A1 | 5/2019 | Iodice |
| 2019/0175077 | A1 | 6/2019 | Zhang |
| 2019/0187244 | A1 | 6/2019 | Riccardi |
| 2019/0196578 | A1 | 6/2019 | Iodice |
| 2019/0196591 | A1 | 6/2019 | Long |
| 2019/0197840 | A1 | 6/2019 | Kappus |
| 2019/0197841 | A1 | 6/2019 | Carter |
| 2019/0197842 | A1 | 6/2019 | Long |
| 2019/0204925 | A1 | 7/2019 | Long |
| 2019/0206202 | A1 | 7/2019 | Carter |
| 2019/0235628 | A1 | 8/2019 | Lacroix |
| 2019/0257932 | A1 | 8/2019 | Carter |
| 2019/0310710 | A1 | 10/2019 | Deeley |
| 2019/0342654 | A1 | 11/2019 | Buckland |
| 2020/0042091 | A1 | 2/2020 | Long |
| 2020/0080776 | A1 | 3/2020 | Kappus |
| 2020/0082221 | A1 | 3/2020 | Tsai |
| 2020/0082804 | A1 | 3/2020 | Kappus |
| 2020/0103974 | A1 | 4/2020 | Carter |
| 2020/0117229 | A1 | 4/2020 | Long |
| 2020/0117993 | A1 | 4/2020 | Martinez-Canales |
| 2020/0193269 | A1 | 6/2020 | Park |
| 2020/0218354 | A1 | 7/2020 | Beattie |
| 2020/0257371 | A1 | 8/2020 | Sung |
| 2020/0285888 | A1 | 9/2020 | Borar |
| 2020/0294299 | A1 | 9/2020 | Rigiroli |
| 2020/0302760 | A1 | 9/2020 | Carter |
| 2020/0320347 | A1 | 10/2020 | Nikolenko |
| 2020/0320351 | A1 | 10/2020 | Nikolenko |
| 2020/0327418 | A1 | 10/2020 | Lyons |
| 2020/0380832 | A1 | 12/2020 | Carter |
| 2021/0037332 | A1 | 2/2021 | Kappus |
| 2021/0043070 | A1 | 2/2021 | Carter |
| 2021/0056693 | A1 | 2/2021 | Cheng |
| 2021/0109712 | A1 | 4/2021 | Long |
| 2021/0111731 | A1 | 4/2021 | Long |
| 2021/0112353 | A1 | 4/2021 | Kappus |
| 2021/0141458 | A1 | 5/2021 | Sarafianou |
| 2021/0162457 | A1 | 6/2021 | Ebefors |
| 2021/0165491 | A1 | 6/2021 | Sun |
| 2021/0170447 | A1 | 6/2021 | Buckland |
| 2021/0183215 | A1 | 6/2021 | Carter |
| 2021/0201884 | A1 | 7/2021 | Kappus |
| 2021/0225355 | A1 | 7/2021 | Long |
| 2021/0275141 | A1 | 9/2021 | Eckersley |
| 2021/0294419 | A1 | 9/2021 | Lee |
| 2021/0303072 | A1 | 9/2021 | Carter |
| 2021/0303758 | A1 | 9/2021 | Long |
| 2021/0334706 | A1 | 10/2021 | Yamaguchi |
| 2021/0381765 | A1 | 12/2021 | Kappus |
| 2021/0397261 | A1 | 12/2021 | Kappus |
| 2022/0000447 | A1 | 1/2022 | Eibl |
| 2022/0035479 | A1 | 2/2022 | Lasater |
| 2022/0083142 | A1 | 3/2022 | Brown |
| 2022/0095068 | A1 | 3/2022 | Kappus |
| 2022/0113806 | A1 | 4/2022 | Long |
| 2022/0155949 | A1 | 5/2022 | Ring |
| 2022/0198892 | A1 | 6/2022 | Carter |
| 2022/0236806 | A1 | 7/2022 | Carter |
| 2022/0252550 | A1 | 8/2022 | Catsis |
| 2022/0300028 | A1 | 9/2022 | Long |
| 2022/0300070 | A1 | 9/2022 | Iodice |
| 2022/0329250 | A1 | 10/2022 | Long |
| 2022/0393095 | A1 | 12/2022 | Chilles |
| 2023/0036123 | A1 | 2/2023 | Long |
| 2023/0075917 | A1 | 3/2023 | Pittera |
| 2023/0087395 | A1 | 3/2023 | Borar |
| 2023/0117919 | A1 | 4/2023 | Iodice |
| 2023/0124704 | A1 | 4/2023 | Buckland |
| 2023/0141896 | A1 | 5/2023 | Liu |
| 2023/0168228 | A1 | 6/2023 | Kappus |
| 2023/0215248 | A1 | 7/2023 | Lowther |
| 2023/0228857 | A1 | 7/2023 | Carter |
| 2023/0251720 | A1 | 8/2023 | Wren |
| 2023/0259213 | A1 | 8/2023 | Long |
| 2023/0360504 | A1 | 11/2023 | Kappus |
| 2023/0368771 | A1 | 11/2023 | Kappus |
| 2023/0378966 | A1 | 11/2023 | Long |
| 2024/0021072 | A1 | 1/2024 | Carter |
| 2024/0036652 | A1 | 2/2024 | Yamada |
| 2024/0056655 | A1 | 2/2024 | Page |
| 2024/0069640 | A1 | 2/2024 | Long |
| 2024/0095953 | A1 | 3/2024 | Lyons |
| 2024/0096183 | A1 | 3/2024 | Carter |
| 2024/0129655 | A1 | 4/2024 | Chilles |
| 2024/0135789 | A1 | 4/2024 | Long |
| 2024/0157399 | A1 | 5/2024 | Buckland |
| 2024/0231492 | A1 | 7/2024 | Beattie |
| 2024/0265907 | A1 | 8/2024 | Long |
| 2024/0288945 | A1 | 8/2024 | Long |
| 2024/0296825 | A1 | 9/2024 | Long |
| 2024/0402809 | A1 | 12/2024 | Kappus |
| 2024/0402996 | A1 | 12/2024 | Long |
| 2024/0411374 | A1 | 12/2024 | Wren |

FOREIGN PATENT DOCUMENTS

| | | | |
|---|---|---|---|
| CN | 101986787 | | 3/2011 |
| CN | 102459900 | | 5/2012 |
| CN | 102591512 | | 7/2012 |
| CN | 103797379 | | 5/2014 |
| CN | 103984414 | A | 8/2014 |
| CN | 107340871 | A | 11/2017 |
| CN | 107407969 | A | 11/2017 |
| CN | 107534810 | A | 1/2018 |
| CN | 108780642 | A | 11/2018 |
| CN | 116034422 | A | 4/2023 |
| EP | 0057594 | A2 | 8/1982 |
| EP | 309003 | | 3/1989 |
| EP | 0696670 | A1 | 2/1996 |
| EP | 1875081 | A1 | 1/2008 |
| EP | 1911530 | | 4/2008 |
| EP | 2271129 | A1 | 1/2011 |
| EP | 1461598 | B1 | 4/2014 |
| EP | 3207817 | A1 | 8/2017 |
| EP | 3216231 | B1 | 8/2019 |
| EP | 3916525 | | 12/2021 |
| GB | 2464117 | | 4/2010 |
| GB | 2513884 | A | 11/2014 |
| GB | 2530036 | | 3/2016 |
| JP | 2008074075 | | 4/2008 |

(56) References Cited

FOREIGN PATENT DOCUMENTS

| | | | |
|---|---|---|---|
| JP | 2010109579 | | 5/2010 |
| JP | 2011172074 | | 9/2011 |
| JP | 2012048378 | A | 3/2012 |
| JP | 5477736 | B2 | 4/2014 |
| JP | 2015035657 | A | 2/2015 |
| JP | 2016035646 | | 3/2016 |
| JP | 2017168086 | | 9/2017 |
| JP | 6239796 | | 11/2017 |
| KR | 20120065779 | | 6/2012 |
| KR | 20130055972 | | 5/2013 |
| KR | 1020130055972 | | 5/2013 |
| KR | 20160008280 | | 1/2016 |
| KR | 20200082449 | A | 7/2020 |
| TW | 201308837 | | 2/2013 |
| WO | 9118486 | | 11/1991 |
| WO | 9639754 | | 12/1996 |
| WO | 03050511 | A | 6/2003 |
| WO | 2005017965 | | 2/2005 |
| WO | 2007144801 | A2 | 12/2007 |
| WO | 2009071746 | A1 | 6/2009 |
| WO | 2009112866 | | 9/2009 |
| WO | 2010003836 | | 1/2010 |
| WO | 2010139916 | | 12/2010 |
| WO | 2011132012 | A1 | 10/2011 |
| WO | 2012023864 | | 2/2012 |
| WO | 2012104648 | A1 | 8/2012 |
| WO | 2013179179 | | 12/2013 |
| WO | 2014181084 | A1 | 11/2014 |
| WO | 2015006467 | | 1/2015 |
| WO | 2015039622 | | 3/2015 |
| WO | 2015127335 | | 8/2015 |
| WO | 2015194510 | | 12/2015 |
| WO | 2016007920 | | 1/2016 |
| WO | 2016073936 | | 5/2016 |
| WO | 2016095033 | A1 | 6/2016 |
| WO | 2016099279 | | 6/2016 |
| WO | 2016132141 | | 8/2016 |
| WO | 2016132144 | | 8/2016 |
| WO | 2016137675 | | 9/2016 |
| WO | 2016162058 | | 10/2016 |
| WO | 2016171651 | | 10/2016 |
| WO | 2017172006 | | 10/2017 |
| WO | 2018000731 | A1 | 1/2018 |
| WO | 2018109466 | A1 | 6/2018 |
| WO | 2018168562 | A1 | 9/2018 |
| WO | 2019190894 | | 10/2019 |
| WO | 2020049321 | A2 | 3/2020 |
| WO | 2021130505 | A1 | 7/2021 |
| WO | 2021260373 | A1 | 12/2021 |
| WO | 2021262343 | | 12/2021 |

OTHER PUBLICATIONS

Office Action (Non-Final Rejection) dated Dec. 20, 2021 for U.S. Appl. No. 17/195,795 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85) dated Apr. 28, 2023 for U.S. Appl. No. 17/195,795 (pp. 1-7).
Office Action (Notice of Allowance and Fees Due (PTOL-85) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85) dated Sep. 12, 2022 for U.S. Appl. No. 16/734,479 (pp. 1-7).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action (Notice of Allowance and Fees Due (PTOL-85)) dated Dec. 14, 2021 for U.S. Appl. No. 17/170,841 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Office Action dated Apr. 17, 2020 for U.S. Appl. No. 16/401,148 (pp. 1-15).
Office Action dated Apr. 18, 2019 for U.S. Appl. No. 16/296,127 (pp. 1-6).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Office Action dated Apr. 4, 2019 for U.S. Appl. No. 15/897,804 (pp. 1-10).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 22, 2019 for U.S. Appl. No. 16/160,862 (pp. 1-5).
Office Action dated Aug. 9, 2021 for U.S. Appl. No. 17/068,825 (pp. 1-9).
Office Action dated Dec. 11, 2019 for U.S. Appl. No. 15/959,266 (pp. 1-15).
Office Action dated Dec. 7, 2020 for U.S. Appl. No. 16/563,608 (pp. 1-8).
Office Action dated Feb. 20, 2019 for U.S. Appl. No. 15/623,516 (pp. 1-8).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 10, 2020 for U.S. Appl. No. 16/228,767 (pp. 1-6).

(56) References Cited

OTHER PUBLICATIONS

Office Action dated Jan. 29, 2020 for U.S. Appl. No. 16/198,959 (p. 1-6).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Search report for PCT/GB2018/051061 dated Sep. 26, 2018 (17 pages).
Search report for PCT/US2018/028966 dated Jul. 13, 2018 (43 pages).
Seo et al., "Improved numerical inverse kinematics for human pose estimation," Opt. Eng. 50(3 037001 (Mar. 1, 2011) https:// doi.org/ 10.1117/1.3549255 (Year: 2011).
Sergey Ioffe et al., Batch Normalization: Accelerating Deep Network Training by Reducing Internal Covariat Shift, Mar. 2, 2015, pp. 1-11.
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Shanxin Yuan et al., BigHand2.2M Bechmark: Hand Pose Dataset and State of the Art Analysis, Dec. 9, 2017, pp. 1-9.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Sixth Sense webpage, http://www.pranavmistry.com/projects/ sixthsense/ Accessed Nov. 30, 2018, 7 pages.
Stan Melax et al., Dynamics Based 3D Skeletal Hand Tracking, May 22, 2017, pp. 1-8.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/ Published online: Jul. 26, 2002, Springer-Verlag 2002, (11 pages).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Sylvia Gebhardt, Ultrasonic Transducer Arrays for Particle Manipulation (date unknown) (2 pages).
Takaaki Kamigaki, Noncontact Thermal and Vibrotactile Display Using Focused Airborne Ultrasound, EuroHaptics 2020, LNCS 12272, pp. 271-278, 2020.
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ ultrahaptics-shows-off-sense-of-touch-in-virtual-reality/ [retrieved on Feb. 13, 2019] 4 pages.
Takahashi, M. et al., Large Aperture Airborne Ultrasound Tactile Display Using Distributed Array Units, SICE Annual Conference 2010 p. 359-62.
Takayuki et al., "Noncontact Tactile Display Based on Radiation Pressure of Airborne Ultrasound" IEEE Transactions on Haptics vol. 3, No. 3, p. 165 (2010).
Teixeira, et al., "A brief introduction to Microsoft's Kinect Sensor," Kinect, 26 pages, retrieved Nov. 2018.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Tom Nelligan and Dan Kass, Intro to Ultrasonic Phased Array (date unknown) (8 pages).
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
Vincent Lepetit et al., Model Based Augmentation and Testing of an Annotated Hand Pose Dataset, ResearchGate, https://www.researchgate.net/publication/307910344, Sep. 2016, 13 pages.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Wang et al., Few-shot adaptive faster r-cnn.' In Proceedings of the IEEE/CVF Conference on Computer Vision and Pattern Recognition, pp. 7173-7182. 2019. (Year: 2019).
Wang et al., Device-Free Gesture Tracking Using Acoustic Signals, ACM MobiCom '16, pp. 82-94 (13 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Wooh et al., "Optimum beam steering of linear phased arays," Wave Motion 29 (1999) pp. 245-265, 21 pages.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Yoshino, K. and Shinoda, H. (2013), "Visio Acoustic Screen for Contactless Touch Interface with Tactile Sensation", University of Tokyo (5 pages).
Zeng, Wejun, "Microsoft Kinect Sensor and Its Effect," IEEE Multimedia, Apr.-Jun. 2012, 7 pages.
Notice of Allowance dated Dec. 21, 2018 for U.S. Appl. No. 15/983,864 (pp. 1-7).
Notice of Allowance dated Feb. 10, 2020, for U.S. Appl. No. 16/160,862 (pp. 1-9).
Notice of Allowance dated Feb. 7, 2019 for U.S. Appl. No. 15/851,214 (pp. 1-7).
Notice of Allowance dated Jul. 22, 2021 for U.S. Appl. No. 16/600,500 (pp. 1-9).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated Jun. 10, 2021 for U.S. Appl. No. 17/092,333 (pp. 1-9).

(56) References Cited

OTHER PUBLICATIONS

Notice of Allowance dated Jun. 17, 2020 for U.S. Appl. No. 15/210,661 (pp. 1-9).
Notice of Allowance dated Jun. 25, 2021 for U.S. Appl. No. 15/396,851 (pp. 1-10).
Notice of Allowance dated May 30, 2019 for U.S. Appl. No. 15/966,213 (pp. 1-9).
Notice of Allowance dated Nov. 5, 2021 for U.S. Appl. No. 16/899,720 (pp. 1-9).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Notice of Allowance in U.S. Appl. No. 15/210,661 dated Jun. 17, 2020 (22 pages).
Obrist et al., Emotions Mediated Through Mid-Air Haptics, CHI 2015, Apr. 18-23, 2015, Seoul, Republic of Korea. (10 pages).
Obrist et al., Talking about Tactile Experiences, CHI 2013, Apr. 27-May 2, 2013 (10 pages).
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Mar. 14, 2022 for U.S. Appl. No. 16/564,016 (pp. 1-12).
Office Action (Final Rejection) dated Mar. 21, 2023 for U.S. Appl. No. 16/995,819 (pp. 1-7).
Office Action (Final Rejection) dated Sep. 16, 2022 for U.S. Appl. No. 16/404,660 (pp. 1-6).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 1, 2023 for U.S. Appl. No. 16/564,016 (pp. 1-10).
Office Action (Non-Final Rejection) dated Mar. 4, 2022 for U.S. Appl. No. 16/404,660 (pp. 1-5).
Office Action (Non-Final Rejection) dated Mar. 15, 2022 for U.S. Appl. No. 16/144,474 (pp. 1-13).
Office Action (Non-Final Rejection) dated Mar. 22, 2023 for U.S. Appl. No. 17/354,636 (pp. 1-5).
Office Action (Non-Final Rejection) dated Apr. 1, 2022 for U.S. Appl. No. 16/229,091 (pp. 1-10).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 2, 2022 for U.S. Appl. No. 17/068,831 (pp. 1-10).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Non-Final Rejection) dated May 25, 2022 for U.S. Appl. No. 16/843,281 (pp. 1-28).
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
ISR for PCT/GB2020/052546 (Feb. 23, 2021) (14 pages).
ISR for PCT/GB2020/053373 (Mar. 26, 2021) (16 pages).
Iwamoto et al. (2008), Non-contact Method for Producing Tactile Sensation Using Airborne Ultrasound, EuroHaptics, pp. 504-513.
Iwamoto et al., Airborne Ultrasound Tactile Display: Supplement, The University of Tokyo 2008 (2 pages).
Iwamoto T et al, "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA, IEEE, (Mar. 25, 2006), ISBN 978-1-4244-0226-7, pp. 57-61.
Jager et al., "Air-Coupled 40-KHZ Ultrasonic 2D-Phased Array Based on a 3D-Printed Waveguide Structure", 2017 IEEE, 4 pages.
Japanese Office Action (with English language translation) for Application No. 2017-514569, dated Mar. 31, 2019, 10 pages.
JonasChatel-Goldman, Touch increases autonomic coupling between romantic partners, Frontiers in Behavioral Neuroscience Mar. 2014, vol. 8, Article 95.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Jonathan Tompson et al., Real-Time Continuous Pose Recovery of Human Hands Using Convolutional Networks, ACM Trans. Graph. 33, 5, Article 169, Aug. 2014, pp. 1-10.
JP Office Action for JP 2020-534355 (Dec. 6, 2022) (8 pages).
K. Jia, Dynamic properties of micro-particles in ultrasonic transportation using phase-controlled standing waves, J. Applied Physics 116, n. 16 (2014) (12 pages).
Kai Tsumoto, Presentation of Tactile Pleasantness Using Airborne Ultrasound, 2021 IEEE World Haptics Conference (WHC) Jul. 6-9, 2021. Montreal, Canada.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Kamakura, T. and Aoki, K. (2006) "A Highly Directional Audio System using a Parametric Array in Air" Wespac IX 2006 (8 pages).
Keisuke Hasegawa, Electronically steerable ultrasound-driven long narrow air stream, Applied Physics Letters 111, 064104 (2017).
Keisuke Hasegawa, Midair Ultrasound Fragrance Rendering, IEEE Transactions on Visualization and Computer Graphics, vol. 24, No. 4, Apr. 2018 1477.
Keisuke Hasegawa,,Curved acceleration path of ultrasound-driven air flow, J. Appl. Phys. 125, 054902 (2019).
Ken Wada, Ring Buffer Basics (2013) 6 pages.
Kolb, et al., "Time-of-Flight Cameras in Computer Graphics," Computer Graphics forum, vol. 29 (2010), No. 1, pp. 141-159.
Konstantinos Bousmalis et al., Domain Separation Networks, 29th Conference on Neural Information Processing Systems (NIPS 2016), Barcelona, Spain. Aug. 22, 2016, pp. 1-15.

(56) References Cited

OTHER PUBLICATIONS

Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Large et al.,Feel the noise: Mid-air ultrasound haptics as a novel human-vehicle interaction paradigm, Applied Ergonomics (2019) (10 pages).
Li, Larry, "Time-of-Flight Camera—An Introduction," Texas Instruments, Technical White Paper, SLOA190B—Jan. 2014 Revised May 2014, 10 pages.
Light, E.D., Progress in Two Dimensional Arrays for Real Time Volumetric Imaging, 1998 (17 pages).
Line S Loken, Coding of pleasant touch by unmyelinated afferents in humans, Nature Neuroscience vol. 12 [ No. 5 [ May 2009 547.
M. Barmatz et al., "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Mahboob, "Artificial neural networks for learning inverse kinematics of humanoid robot arms." MS Thesis, 2015. (Year: 2015) 95 pages.
Mahdi Rad et al., Feature Mapping for Learning Fast and Accurate 3D Pose Inference from Synthetic Images, Mar. 26, 2018, pp. 1-14.
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Mariana von Mohr, The soothing function of touch: affective touch reduces feelings of social exclusion, Scientific Reports, 7: 13516, Oct. 18, 2017.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Marzo et al., Holographic acoustic elements for manipulation of levitated objects, Nature Communications DOI: 10.1038/ncomms9661 (2015) (7 pages).
Meijster, A., et al., "A General Algorithm for Computing Distance Transforms in Linear Time," Mathematical Morphology and its Applications to Image and Signal Processing, 2002, pp. 331-340.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Mohamed Yacine Tsalamlal, Non-Intrusive Haptic Interfaces: State-of-the Art Survey, HAID 2013, LNCS 7989, pp. 1-9, 2013.
Mueller, GANerated Hands for Real-Time 3D Hand Tracking from Monocular RGB, Eye in-Painting with Exemplar Generative Adverserial Networks, pp. 49-59 (Jun. 1, 2018).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 ( Year: 2010), 20 pages.
Notice of Allowance dated Feb. 23, 2023 for U.S. Appl. No. 18/060,556 (pp. 1-10).
Notice of Allowance dated Apr. 20, 2021 for U.S. Appl. No. 16/563,608 (pp. 1-5).
Notice of Allowance dated Apr. 22, 2020 for U.S. Appl. No. 15/671,107 (pp. 1-5).
Notice of Allowance dated Dec. 19, 2018 for U.S. Appl. No. 15/665,629 (pp. 1-9).
"Flexible piezoelectric transducer for ultrasonic inspection of non-planar components." Ultrasonics 48.5 (2008): 367-375.
Andre J. Duerinckx, Matched gaussian apodization of pulsed acoustic phased arrays, Ultrasonic Imaging, vol. 2, Issue 4, Oct. 1980, pp. 338-369.
Cappellari et al., "Identifying Electromyography Sensor Placement using Dense Neural Networks." In Data, pp. 130-141. 2018. ( Year: 2018).
EPO Examination Report for EP19769198.3 (Jul. 11, 2023) 9 pages.
Examination Report for EP 17 826 539.3 (Aug. 2, 2023) (5 pages).
First Examination report for ndian Patent Application No. 202247024128 (Aug. 11, 2023) (6 pages).
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/050001 (May 24, 2023) (20 pages).
ISR and WO for PCT/GB2023/052122 (Oct. 18, 2023) 13 pages.
ISR and WO for PCT/GB2023/052612 (Mar. 7, 2024) 18 pages.
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
Nuttall, A. (Feb. 1981). Some windows with very good sidelobe behavior. IEEE Transactions on Acoustics, Speech, and Signal Processing. 8 pages.
Ochiai, Cross-Field Aerial Haptics: Rendering Haptic Feedback in Air with Light and Acoustic Fields, CHI (Year: 2016) 10 pages.
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jul. 25, 2023 for U.S. Appl. No. 17/454,823 (pp. 1-17).
Office Action (Final Rejection) dated Aug. 30, 2023 for U.S. Appl. No. 16/564,016 (pp. 1-15).
Office Action (Non-Final Rejection) dated Jan. 19, 2024 for U.S. Appl. No. 18/305,354 (pp. 1-4).
Office Action (Non-Final Rejection) dated Feb. 1, 2024 for U.S. Appl. No. 17/835,411 (pp. 1-7).
Office Action (Non-Final Rejection) dated Mar. 14, 2024 for U.S. Appl. No. 18/188,584 (pp. 1-5).
Office Action (Non-Final Rejection) dated Mar. 28, 2024 for U.S. Appl. No. 18/359,951 (pp. 1-5).
Office Action (Non-Final Rejection) dated Sep. 7, 2023 for U.S. Appl. No. 16/144,474 (pp. 1-16).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Notice of Allowance and Fees Due (PTOL-85)) dated Jan. 31, 2024 for U.S. Appl. No. 18/352,981 (pp. 1-6).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).

(56) References Cited

OTHER PUBLICATIONS

Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Prabhu, K. M. (2013). Window Functions and Their Applications in Signal Processing . CRC Press., pp. 87-127.
Schiefler, Generation and Analysis of Ultrasound Images Using Plane Wave and Sparse Arrays Techniques, Sensors (Year: 2018) 23 pages.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
EPO ISR and WO for PCT/GB2022/050204 (Apr. 7, 2022) (15 pages).
EPO Office Action for EP16708440.9 dated Sep. 12, 2018 (7 pages).
EPSRC Grant summary EP/J004448/1 (2011) (1 page).
Eric Tzeng et al., Adversarial Discriminative Domain Adaptation, Feb. 17, 2017, pp. 1-10.
European Office Action for Application No. EP16750992.6, dated Oct. 2, 2019, 3 pages.
Ex Parte Quayle Action dated Dec. 28, 2018 for U.S. Appl. No. 15/966,213 (pp. 1-7).
Extended European Search Report for Application No. EP19169929.7, dated Aug. 6, 2019, 7 pages.
Freeman et al., Tactile Feedback for Above-Device Gesture Interfaces: Adding Touch to Touchless Interactions ICMI'14, Nov. 12-16, 2014, Istanbul, Turkey (8 pages).
Gareth Young et al.. Designing Mid-Air Haptic Gesture Controlled User Interfaces for Cars, PACM on Human-Computer Interactions, Jun. 2020 (24 pages).
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
GitHub—danfis/libccd: Library for collision detection between two convex shapes, Mar. 26, 2020, pp. 1-6.
GitHub—IntelRealSense/hand_tracking_samples: researc codebase for depth-based hand pose estimation using dynamics based tracking and CNNs, Mar. 26, 2020, 3 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Guez, "Solution to the inverse kinematic problem in robotics by neural networks." In Proceedings of the 2nd International Conference on Neural Networks, 1988. San Diego, California. (Year: 1988) 8 pages.
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Henrik Bruus, Acoustofluidics 2: Perturbation theory and ultrasound resonance modes, Lab Chip, 2012, 12, 20-28.
Hilleges et al. Interactions in the air: adding further depth to interactive tabletops, UIST '09: Proceedings of the 22nd annual ACM symposium on User interface software and technologyOct. 2009 pp. 139-148.
Hoshi et al.,Tactile Presentation by Airborne Ultrasonic Oscillator Array, Proceedings of Robotics and Mechatronics Lecture 2009, Japan Society of Mechanical Engineers; May 24, 2009 (5 pages).
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Hoshi, T., Development of Aerial-Input and Aerial-Tactile-Feedback System, IEEE World Haptics Conference 2011, p. 569-573.
Hoshi, T., Handwriting Transmission System Using Noncontact Tactile Display, IEEE Haptics Symposium 2012 pp. 399-401.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Hoshi, T., Touchable Holography, SIGGRAPH 2009, New Orleans, Louisiana, Aug. 3-7, 2009. (1 page).
https://radiopaedia.org/articles/physical-principles-of-ultrasound-1?lang=gb (Accessed May 29, 2022).
Hua J, Qin H., Haptics-based dynamic implicit solid modeling, IEEE Trans Vis Comput Graph. Sep.-Oct. 2004;10 (5):574-86.
Hyunjae Gil, Whiskers: Exploring the Use of Ultrasonic Haptic Cues on the Face, CHI 2018, Apr. 21-26, 2018, Montréal, QC, Canada.
Iddan, et al., "3D Imaging in the Studio (And Elsewhwere . . . " Apr. 2001, 3DV systems Ltd., Yokneam, Isreal, www.3dvsystems.com.il, 9 pages.
Imaginary Phone: Learning Imaginary Interfaces by Transferring Spatial Memory From a Familiar Device Sean Gustafson, Christian Holz and Patrick Baudisch. UIST 2011. (10 pages).
IN 202047026493 Office Action dated Mar. 8, 2022, 6 pages.
India Morrison, The skin as a social organ, Exp Brain Res (2010) 204:305-314.
International Preliminary Report on Patentability and Written Opinion issued in corresponding PCT/US2017/035009, dated Dec. 4, 2018, 8 pages.
International Preliminary Report on Patentability for Application No. PCT/EP2017/069569 dated Feb. 5, 2019, 11 pages.
International Search Report and Written Opinion for App. No. PCT/GB2021/051590, dated Nov. 11, 2021, 20 pages.
International Search Report and Written Opinion for Application No. PCT/GB2018/053738, date of mailing Apr. 11, 2019, 14 pages.
International Search Report and Written Opinion for Application No. PCT/GB2018/053739, date of mailing Jun. 4, 2019, 16 pages.
International Search Report and Written Opinion for Application No. PCT/GB2019/050969, date of mailing Jun. 13, 2019, 15 pages.
International Search Report and Written Opinion for Application No. PCT/GB2019/051223, date of mailing Aug. 8, 2019, 15 pages.
International Search Report and Written Opinion for Application No. PCT/GB2019/052510, date of mailing Jan. 14, 2020, 25 pages.
Invitation to Pay Additional Fees for PCT/GB2022/051821 (Oct. 20, 2022), 15 pages.
ISR & WO for PCT/GB2020/052545 (Jan. 27, 2021) 14 pages.
ISR & WO For PCT/GB2021/052946, 15 pages.
ISR & WO for PCT/GB2022/051388 (Aug. 30, 2022) (15 pages).
ISR and WO for PCT/GB2020/050013 (Jul. 13, 2020) (20 pages).
ISR and WO for PCT/GB2020/050926 (Jun. 2, 2020) (16 pages).
ISR and WO for PCT/GB2020/052544 (Dec. 18, 2020) (14 pages).
ISR and WO for PCT/GB2020/052829 (Feb. 10, 2021) (15 pages).
ISR and WO for PCT/GB2021/052415 (Dec. 22, 2021) (16 pages).
"Welcome to Project Soli" video, https://atap.google.com/#project-soli Accessed Nov. 30, 2018, 2 pages.

(56) References Cited

OTHER PUBLICATIONS

A. B. Vallbo, Receptive field characteristics of tactile units with myelinated afferents in hairy skin of human subjects, Journal of Physiology (1995), 483.3, pp. 783-795.
A. Sand, Head-Mounted Display with Mid-Air Tactile Feedback, Proceedings of the 21st ACM Symposium on Virtual Reality Software and Technology, Nov. 13-15, 2015 (8 pages).
Aksel Sveier et al.,Pose Estimation with Dual Quaternions and Iterative Closest Point, 2018 Annual American Control Conference (ACC) (8 pages).
Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).
Alexander, J. et al. (2011), Adding Haptic Feedback to Mobile TV (6 pages).
Almusawi et al., "A new artificial neural network approach in solving inverse kinematics of robotic arm (denso vp6242)." Computational intelligence and neuroscience 2016 (2016). (Year: 2016).
Amanda Zimmerman, The gentle touch receptors of mammalian skin, Science, Nov. 21, 2014, vol. 346 Issue 6212, p. 950.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Aoki et al., Sound location of stero reproduction with parametric loudspeakers, Applied Acoustics 73 (2012) 1289-1295 (7 pages).
Ashish Shrivastava et al., Learning from Simulated and Unsupervised Images through Adversarial Training, Jul. 19, 2017, pp. 1-16.
Azad et al., Deep domain adaptation under deep label scarcity.' arXiv preprint arXiv:1809.08097 (2018) (Year: 2018).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Beranek, L., & Mellow, T. (2019). Acoustics: Sound Fields, Transducers and Vibration. Academic Press, 3 pages.
Bortoff et al., Pseudolinearization of the Acrobot using Spline Functions, IEEE Proceedings of the 31st Conference on Decision and Control, Sep. 10, 1992 (6 pages).
Boureau et al.,"A theoretical analysis of feature pooling in visual recognition." In Proceedings of the 27th international conference on machine learning (ICML-10), pp. 111-118. 2010. (Year: 2010).
Bożena Smagowska & Malgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Canada Application 2,909,804 Office Action dated Oct. 18, 2019, 4 pages.
Casper et al., Realtime Control of Multiple-focus Phased Array Heating Patterns Based on Noninvasive Ultrasound Thermography, IEEE Trans Biomed Eng. Jan. 2012; 59(1): 95-105.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Certon, D., Felix, N., Lacaze, E., Teston, F., & Patat, F. (2001). Investigation of cross-coupling in 1-3 piezocomposite arrays. ieee transactions on ultrasonics, ferroelectrics, and frequency control, 48(1), 85-92.
Chang Suk Lee et al., An electrically switchable visible to infra-red dual frequency cholesteric liquid crystal light shutter, J. Mater. Chem. C, 2018, 6, 4243 (7 pages).
Christoper M. Bishop, Pattern Recognition and Machine Learning, 2006, pp. 1-758.
Colgan, A., "How Does the Leap Motion Controller Work?" Leap Motion, Aug. 9, 2014, 10 pages.
Communication Pursuant to Article 94(3) EPC for EP 19723179.8 (Feb. 15, 2022), 10 pages.
Corrected Notice of Allowability dated Aug. 9, 2021 for U.S. Appl. No. 15/396,851 (pp. 1-6).
Corrected Notice of Allowability dated Jan. 14, 2021 for U.S. Appl. No. 15/897,804 (pp. 1-2).
Corrected Notice of Allowability dated Jun. 21, 2019 for U.S. Appl. No. 15/966,213 (2 pages).
Corrected Notice of Allowability dated Nov. 24, 2021 for U.S. Appl. No. 16/600,500 (pp. 1-5).
Corrected Notice of Allowability dated Oct. 31, 2019 for U.S. Appl. No. 15/623,516 (pp. 1-2).
Damn Geeky, "Virtual projection keyboard technology with haptic feedback on palm of your hand," May 30, 2013, 4 pages.
David Joseph Tan et al., Fits like a Glove: Rapid and Reliable Hand Shape Personalization, 2016 IEEE Conference on Computer Vision and Pattern Recognition, pp. 5610-5619.
Definition of "Interferometry" according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
Der et al., Inverse kinematics for reduced deformable models.' ACM Transactions on graphics (TOG) 25, No. 3 (2006): 1174-1179. (Year: 2006).
DeSilets, C. S. (1978). Transducer arrays suitable for acoustic imaging (No. GL-2833). Stanford Univ CA Edward L Ginzton Lab of Physics. 5 pages.
Diederik P. Kingma et al., Adam: A Method for Stochastic Optimization, Jan. 30, 2017, pp. 1-15.
Duka, "Neural network based inverse kinematics solution for trajectory tracking of a robotic arm." Procedia Technology 12 (2014) 20-27. (Year: 2014).
E. Bok, Metasurface for Water-to-Air Sound Transmission, Physical Review Letters 120, 044302 (2018) (6 pages).
E.S. Ebbini et al. (1991), A spherical-section ultrasound phased array applicator for deep localized hyperthermia, Biomedical Engineering, IEEE Transactions on (vol. 38 Issue: 7), pp. 634-643.
EPO 21186570.4 Extended Search Report dated Oct. 29, 2021, 10 pages.
EPO Application 18 725 358.8 Examination Report Dated Sep. 22, 2021, 15 pages.
EPO Communication for Application 18 811 906.9 (Nov. 29, 2021) (15 pages).
EPO Examination Report 17 748 4656.4 (Jan. 12, 2021) (16 pages).
EPO Examination Search Report 17 702 910.5 (Jun. 23, 2021) 10 pages.
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jun. 25, 2021 for U.S. Appl. No. 16/899,720 (pp. 1-5).
Office Action dated Mar. 11, 2021 for U.S. Appl. No. 16/228,767 (pp. 1-23).
Office Action dated Mar. 20, 2020 for U.S. Appl. No. 15/210,661 (pp. 1-10).

(56) References Cited

OTHER PUBLICATIONS

Office Action dated Mar. 31, 2021 for U.S. Appl. No. 16/228,760 (pp. 1-21).
Office Action dated May 13, 2021 for U.S. Appl. No. 16/600,500 (pp. 1-9).
Office Action dated May 14, 2021 for U.S. Appl. No. 16/198,959 (pp. 1-6).
Office Action dated May 16, 2019 for U.S. Appl. No. 15/396,851 (pp. 1-7).
Office Action dated May 18, 2020 for U.S. Appl. No. 15/960,113 (pp. 1-21).
Office Action dated Oct. 17, 2019 for U.S. Appl. No. 15/897,804 (pp. 1-10).
Office Action dated Oct. 29, 2021 for U.S. Appl. No. 16/198,959 (pp. 1-7).
Office Action dated Oct. 31, 2019 for U.S. Appl. No. 15/671,107 (pp. 1-6).
Office Action dated Oct. 7, 2019 for U.S. Appl. No. 15/396,851 (pp. 1-9).
Office Action dated Sep. 16, 2021 for U.S. Appl. No. 16/600,496 (pp. 1-8).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Office Action dated Sep. 24, 2021 for U.S. Appl. No. 17/080,840 (pp. 1-9).
OGRECave/ogre—GitHub: ogre/Samples/Media/materials at 7de80a7483f20b50f2b10d7ac6de9d9c6c87d364, Mar. 26, 2020, 1 page.
Oikonomidis et al., "Efficient model-based 3D tracking of hand articulations using Kinect." In BmVC, vol. 1, No. 2, p. 3. 2011. (Year: 2011).
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Partial International Search Report for Application No. PCT/GB2018/053735, date of mailing Apr. 12, 2019, 14 pages.
Partial ISR for Application No. PCT/GB2020/050013 dated May 19, 2020 (16 pages).
Partial ISR for PCT/GB2023/050001 (Mar. 31, 2023) 13 pages.
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
PCT Partial International Search Report for Application No. PCT/GB2018/053404 date of mailing Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Phys.org, Touchable Hologram Becomes Reality, Aug. 6, 2009, by Lisa Zyga (2 pages).
Pompei, F.J. (2002), "Sound from Ultrasound: The Parametric Array as an Audible Sound Source", Massachusetts Institute of Technology (132 pages).
Rakkolainen et al., A Survey of Mid-Air Ultrasound Haptics and Its Applications (IEEE Transactions on Haptics), vol. 14, No. 1, 2021, 18 pages.
Rocchesso et al., Accessing and Selecting Menu Items by In-Air Touch, ACM CHItaly'19, Sep. 23-25, 2019, Padova, Italy (9 pages).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Schmidt, Ralph, "Multiple Emitter Location and Signal Parameter Estimation" IEEE Transactions of Antenna and Propagation, vol. AP-34, No. 3, Mar. 1986, pp. 276-280.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Search Report by EPO for EP 17748466 dated Jan. 13, 2021 (16 pages).
Search Report for GB1308274.8 dated Nov. 11, 2013. (2 pages).
Search Report for GB1415923.0 dated Mar. 11, 2015. (1 page).
Search Report for PCT/GB/2017/053729 dated Mar. 15, 2018 (16 pages).
Search Report for PCT/GB/2017/053880 dated Mar. 21, 2018. (13 pages).
Search report for PCT/GB2014/051319 dated Dec. 8, 2014 (4 pages).
Search report for PCT/GB2015/052507 dated Mar. 11, 2020 (19 pages).
Search report for PCT/GB2015/052578 dated Oct. 26, 2015 (12 pages).
Search report for PCT/GB2015/052916 dated Feb. 26, 2020 (18 pages).
Search Report for PCT/GB2017/052332 dated Oct. 10, 2017 (12 pages).
"Ryoko Takahashi, Keisuke Hasegawa, Hiroyuki Shinoda, Tactile Stimulation by Repetitive Lateral Movement of Midair Ultrasound Focus, Apr.-Jun. 2020, IEEE Transactions on Haptics, vol. 13, No. 2" (Year: 2020) 9 pages.
Bjørn Kolbrek, Modal Propagat Ion in Acous Tic Horns (Jun. 2012) (127 pages).
Chen, Xi. "Real-time Action Recognition for RGB-D and Motion Capture Data." (2014). (Year: 2014) 107 pages.
Kavan et al. (Dual Quaternions for Rigid Transformation Blending, 2006, ResearchGate, pp. 2-11) (Year: 2006).
Kussaba et al. (Hybrid kinematic control for rigid body pose stabilization using dual quaternions, Journal of the Franklin Institute 354 (2017) 2769-2787) (Year: 2017).
Notice of Allowance dated Sep. 16, 2024 for U.S. Appl. No. 18/305,354 (pp. 1-9).
Office Action (Final Rejection) dated Jun. 27, 2024 for U.S. Appl. No. 18/188,584 (pp. 1-5).
Office Action (Final Rejection) dated Aug. 1, 2024 for U.S. Appl. No. 18/305,354 (pp. 1-10).
Office Action (Non-Final Rejection) dated Jun. 4, 2024 for U.S. Appl. No. 18/348,663 (pp. 1-18).
Office Action (Non-Final Rejection) dated Jun. 5, 2024 for U.S. Appl. No. 18/513,902 (pp. 1-16).
Office Action (Non-Final Rejection) dated Jun. 10, 2024 for U.S. Appl. No. 17/212,774 (pp. 1-15).
Office Action (Non-Final Rejection) dated Jun. 26, 2024 for U.S. Appl. No. 16/564,016 (pp. 1-15).
Office Action (Non-Final Rejection) dated Jul. 25, 2024 for U.S. Appl. No. 17/822,224 (pp. 1-16).
Office Action (Non-Final Rejection) dated Jul. 30, 2024 for U.S. Appl. No. 18/365,313 (pp. 1-7).
Office Action (Non-Final Rejection) dated Aug. 26, 2024 for U.S. Appl. No. 18/417,653 (pp. 1-13).
Office Action (Non-Final Rejection) dated Aug. 27, 2024 for U.S. Appl. No. 18/153,337 (pp. 1-6).
Office Action (Non-Final Rejection) dated Dec. 18, 2024 for U.S. Appl. No. 18/496,002 (pp. 1-5).

(56) References Cited

OTHER PUBLICATIONS

Office Action (Non-Final Rejection) dated Dec. 19, 2024 for U.S. Appl. No. 18/623,940 (pp. 1-7).
Office Action (Notice of Allowance and Fees Due (PTOL-85)) dated May 30, 2024 for U.S. Appl. No. 18/359,951 (pp. 1-7).
Office Action (Notice of Allowance and Fees Due (PTOL-85)) dated Jul. 22, 2024 for U.S. Appl. No. 17/835,411 (pp. 1-7).
Office Action (Notice of Allowance and Fees Due (PTOL-85)) dated Aug. 5, 2024 for U.S. Appl. No. 17/835,411 (pp. 1-2).
Office Action (Notice of Allowance and Fees Due (PTOL-85)) dated Aug. 28, 2024 for U.S. Appl. No. 18/365,313 (pp. 1-5).
Office Action (Notice of Allowance and Fees Due (PTOL-85)) dated Dec. 11, 2024 for U.S. Appl. No. 18/648,428 (pp. 1-8).
Polychronopoulos et al., Acoustic levitation with optimized reflective metamaterials, Scientific Reports (2020) 10:4254 (10 pages).
Supancic et al., "Depth-based hand pose estimation: data, methods, and challenges." In Proceedings of the IEEE international conference on computer vision, pp. 1868-1876. 2015. (Year: 2015).
Wang et al. (Translation and attitude synchronization for multiple rigid bodies using dual quaternions, Journal of the Franklin Institute 354 (2017) 3594-3616) (Year: 2017).
Wu et al. (Strapdown Inertial Navigation System Algorithms Based on Dual Quaternions,2009, IEEE, 2005, pp. 110-132) (Year: 2005).
Zhao et al., "Combining marker-based MOCAP and RGB-d camera for acquiring high-fidelity hand motion data." In Proceedings of the ACMSIGGRAPH/EurographicsSymposiumonComputer Animation. Eurographics Association, 33-42, 2012. (Year: 2012).

* cited by examiner

MINIMIZING UNWANTED RESPONSES IN HAPTIC SYSTEMS

RELATED APPLICATION

This application claims the benefit of two U.S. Provisional patent applications, each of which is incorporated by reference in its entirety:

1) Ser. No. 62/609,429, filed on Dec. 22, 2017; and
2) Ser. No. 62/777,770, filed on Dec. 11, 2018.

FIELD OF THE DISCLOSURE

The present disclosure relates generally to improved techniques for minimizing unwanted responses in haptic feedback systems.

BACKGROUND

A continuous distribution of sound energy, which we will refer to as an "acoustic field", can be used for a range of applications including haptic feedback in mid-air.

Haptic curve reproduction involves the rapid translation of focal points in an ultrasonic phased array configuration in order to create a haptic sensation. Human skin is not sensitive to ultrasound frequencies alone, but can be stimulated by modulating ultrasound by a low frequency (~100 Hz) signal. An alternative to modulation in pressure amplitude (the traditional approach) is spatiotemporal modulation—moving a focal point along a repeatable path produces a similar modulated pressure at any one point along that path to that of simple amplitude modulation. This pressure profile produces a sensation on the skin and therefore can be used for haptic feedback. This can be used to create shapes, volumes, and other haptic effects.

Because haptics from ultrasound requires large pressure amplitudes, it is susceptible to the generation of parametric audio. This is an effect whereby the nonlinearity of soundwaves in air can create audible sound. This mixing takes the form of difference tones (intermodulation distortion). For instance, if 40 kHz and 41 kHz sound waves are produced from the same transducer at sufficient amplitude, a 41−40=1 kHz tone is produced in the air and is perceivable. This is particularly easy to do with traditional amplitude modulation. For instance, modulating a 40,000 kHz by 200 Hz becomes, $$(0.5+0.5\cos(2\pi*200t))\cos(2\pi 40000t)=0.5\cos(2\pi 40000t)+0.25\cos(2\pi 39800t)+0.25\cos(2\pi 40200t).$$

The modulation splits the 40 kHz carrier into two sidebands at 39.8 kHz and 40.2 kHz. The resulting frequencies can mix to form 200 Hz and 400 Hz.

Spatiotemporal modulation can also lead to many side bands with large spacing which leads to intermodulation distortion at many frequencies. Moving a focal point in space requires each transducer to shift its output rapidly in phase. This can be described by, $$\text{output}(t)=\cos(\omega_c t+f(t)),$$

where $\omega_c$ is the ultrasonic carrier frequency (2*pi*40 kHz in the previous example) and f(t) represents the phase angle. While the amplitude of the curve remains constant, changing the phase in time causes deviation from a pure tone. This comes about by expanding the function, $$\cos(\omega_c t+f(t)) = \cos(f(t))\cos(\omega_c t) - \sin(f(t))\sin(\omega_c t) = \cos(\omega_c t)\sum_{k=0}^{\infty}\frac{(-1)^k f(t)^{2k}}{(2k)!} - \sin(\omega_c t)\sum_{k=0}^{\infty}\frac{(-1)^k f(t)^{2k+1}}{(2k+1)!}.$$

In this form, it is clear that modulating the phase can wrap into sidebands related to multiple powers of the phase function. FIG. 1 is a graph 100 of an example using a pure cosine as the phase modulation function showing a frequency power spectrum of $\cos(\omega_c t+2\pi\cos(2\pi 2000)$. The x-axis 110 is frequency in kHz. The y-axis 120 is in dB. The plot 130 shows the resulting power spectrum that is the interplay of the multiple frequencies produced by increasing powers in the exponent with the decreased magnitude from the factorial denominator. The banding is spaced at 200 Hz (modulation frequency) and largely contained within 2 kHz of the 40 kHz carrier. The sidebands continue indefinitely, of course, but are beyond the precision of this simulation and at those amplitudes, unimportant.

Note that the phase functions presented here can be implemented as driving signals to transducers but also can be implemented as physical displacement. If the transducer is moved one carrier wavelength relative to others towards or away from the path, that represents a 2π (phase shift, and can be interpolated in between. Smoothing methods presented here can be applied to this displacement-generated phase function equally well.

Further, high-Q resonant systems have a narrow frequency response but as a result, a long impulse response. Energy takes many cycles to leave the system and at any particular moment the current state is highly dependent on driving history. A typical solution to this problem involves using a drive amplitude (or width in the case of pulse-width-modulation (PWM)) which results in the correct steady-state result. The desired output will only be generated after sufficient cycles have elapsed related to the ring up time. While this results in the ideal solution when full amplitude is desired, headroom in the driving circuit is unused when less than full amplitude is needed.

Take, for instance, a linear system that takes 5 cycles to reach 95% steady-state value. It approaches the steady state exponentially and can reach approximately 45% of the final value in one cycle with each additional cycle yielding diminishing returns. If the desired final output is the maximum output that the system is capable of, getting there in 5 cycles is optimal. However, if the desired output is only 45% of maximum, a different solution would be to drive it at full-scale for one cycle, then cut the drive back to what would yield a steady-state result of 45% of maximum. The result is the system reaching the desired output in one cycle rather than 5. In this invention, we present methods to characterize the system and predict the necessary drive conditions to force it into an output faster than steady-state driving conditions are capable of.

SUMMARY

Any haptic curve must be represented as a location as a function of time to be traced using an acoustic focus from a phased array. Disclosed are methods to manipulate a given parametrized curve in order to yield a smooth phase function for each transducer which minimizes unwanted parametric audio.

Further, the impulse response of a system describes the behavior of the system over time and can be convolved with a given input to simulate a response to that input. To produce a specific response, a deconvolution with the impulse response is necessary to generate an input. In a highly-resonant system the impulse response can be simplified to Fourier components at the resonant frequency which reduces deconvolution to algebra. This allows for feed-forward input generation for a desired output via linear algebra.

BRIEF DESCRIPTION OF THE FIGURES

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1:
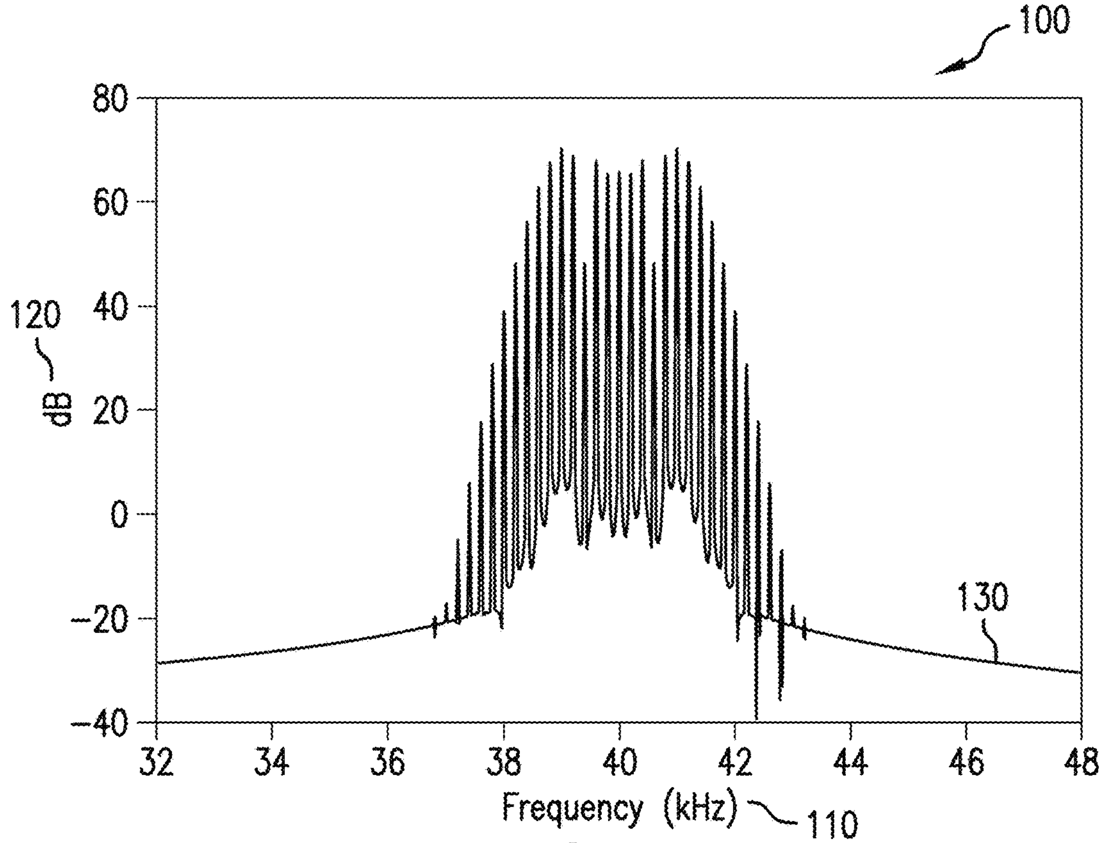
FIG. 1 shows a graph of a pure cosine as a phase modulation function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

(1) Methods for Audio Reduction in Airborne Haptic Curves

A given curve to be traced with spatiotemporal modulation does not define a unique phase function (f(t)) solution. For instance, when tracing a line, more time could be spent on one half of the line than the other. Compared to an equal-time line this will create a different phase functions, yet the entire line is traced in both cases. On top of this, a given curve (repeated with a specific frequency) does not define a unique haptic experience. For a given carrier frequency, diffraction will limit the focusing resolution, and therefore some small deviations in the focus position can be made for a given curve and not create a discernible effect. The goal of this disclosure is to present methods with which to create a requested spatiotemporal haptic effect by adjusting the curve to be traced and the phase function(s) to trace that curve in a way which produces minimal parametric audio.

Figure 2:
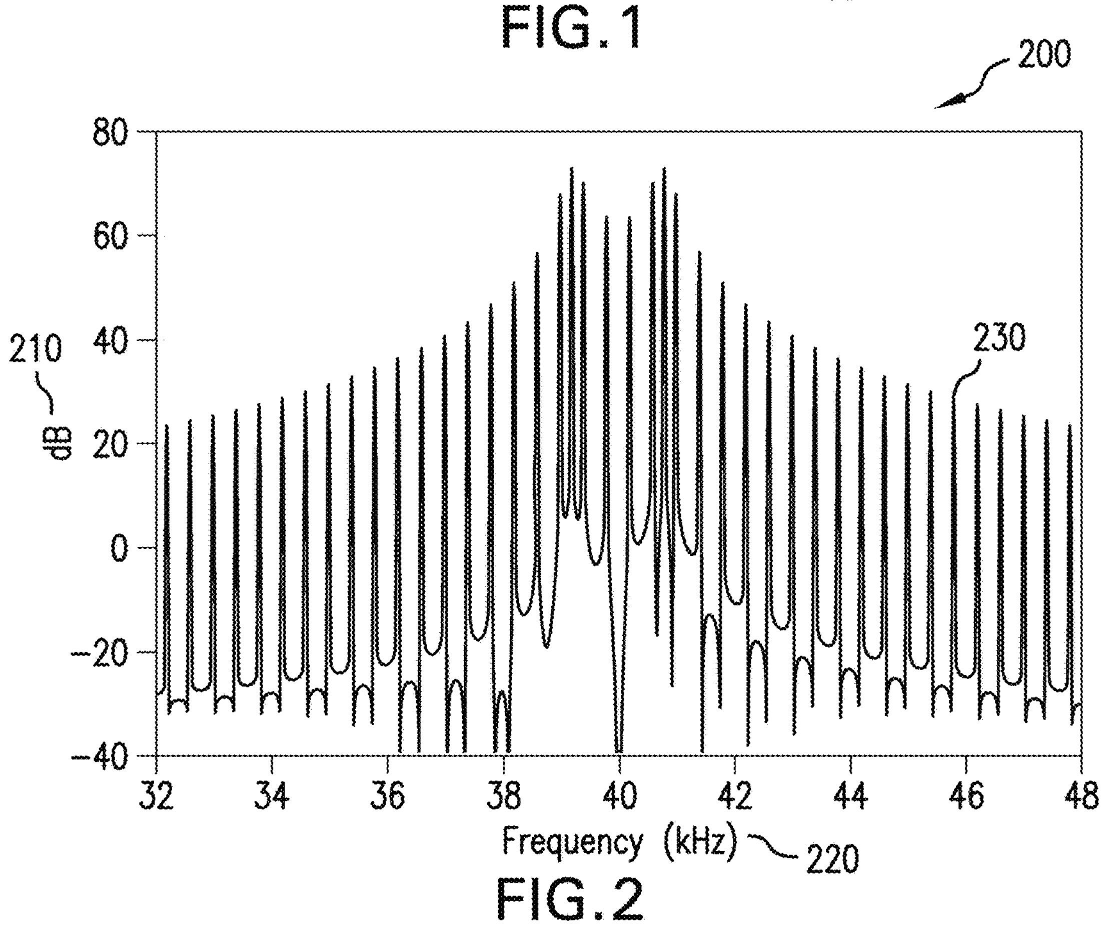
FIG. 2 shows a graph of a phase modulation function with high frequency components.

FIG. 2 is a graph 200 of an example of a phase modulation function with high frequency components. It is a frequency power spectrum of cos($\omega_c$t+2π triangle (2 π2000). The x-axis 220 is frequency in kHz. The y-axis 210 is dB. As shown in the plot 230, by using a triangle wave, higher frequency harmonics are contained in every power of the modulating function and give rise to many side bands at high-frequency spacing. These then mix to make higher-frequency audio. It is interesting to note that the banding is spaced at 400 Hz instead of 200 Hz except at two small clusters around +/−800 Hz. This is due to some coincidental cancellation of various terms when using a perfect triangle wave.

Sharp features in the phase modulation function arise from sharp features in the curve being traced by the array. This includes both sharp features in space (hard angles, changes in direction) but also sharp features in time (sudden stops or starts). For instance, a common path in airborne haptics is a line parallel to the array at a fixed height. The array traces the line from one end to the other and back again at a frequency selected to maximize sensitivity.

Figure 3:
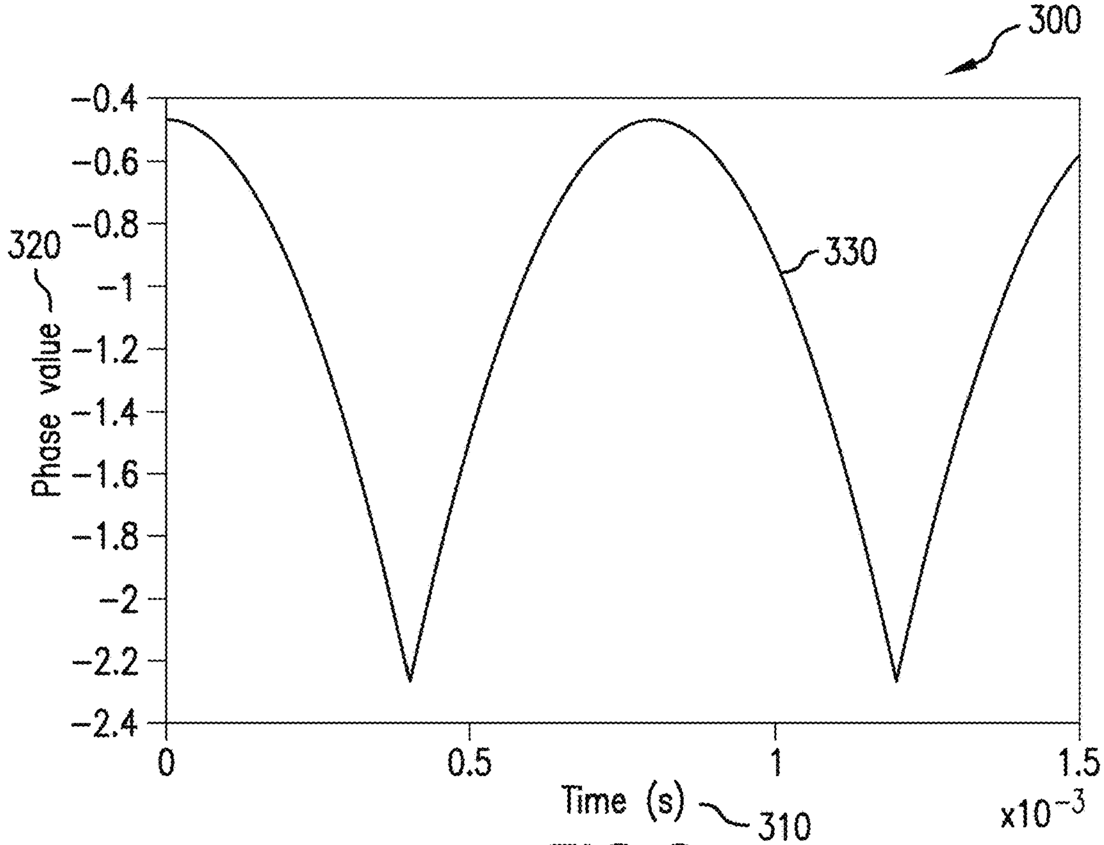
FIG. 3 shows a graph of a phase function for a transducer.

FIG. 3 shows a graph 300 of the resulting phase function for a transducer directly below one end of the line which in this case is 3 cm in length. The x-axis 310 is time in seconds. The y-axis 320 is the phase value. A plot 330 of phase versus time for a fixed-velocity horizontal line at a height of 20 cm and 3 cm in length for an emitter placed directly under starting point operating at 125 Hz.

Figure 4:
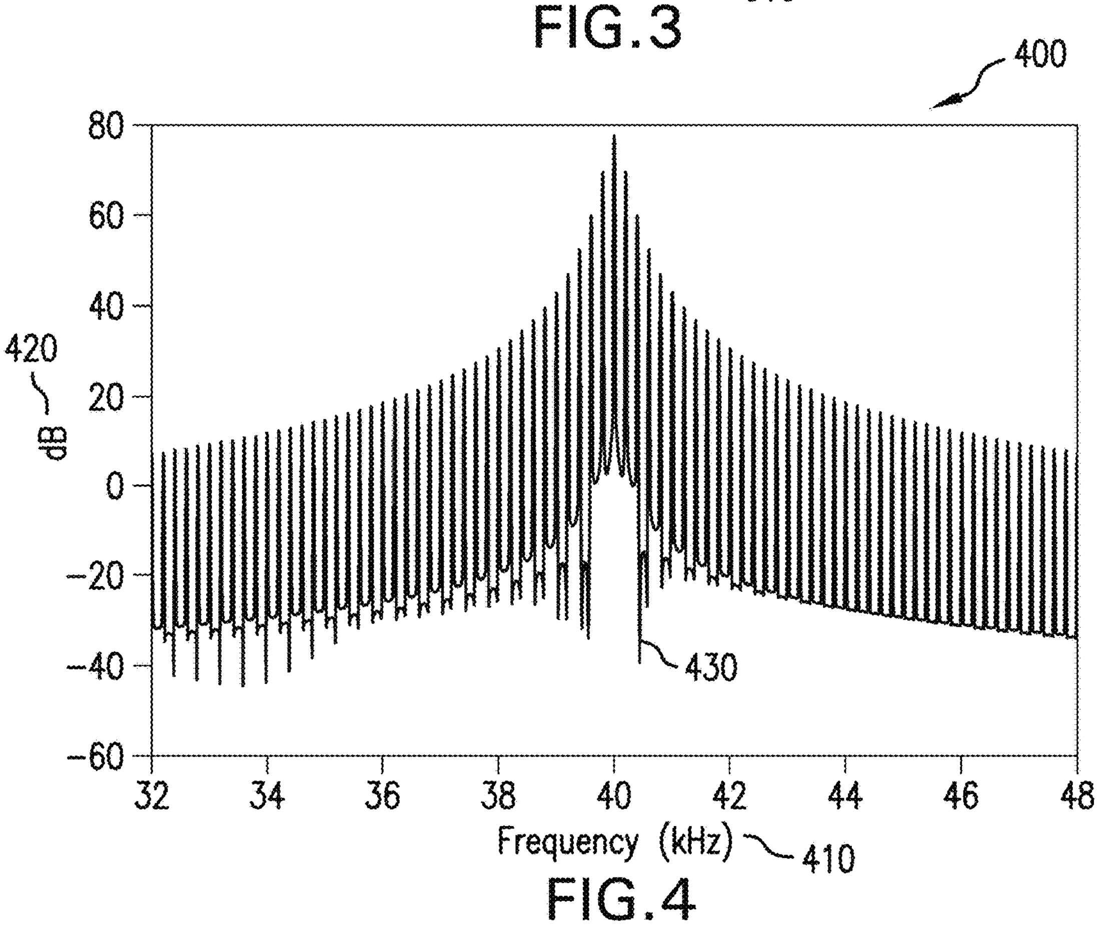
FIG. 4 shows a graph of a frequency power spectrum resulting from the phase function shown in FIG. 3.

The phase function value is related to the distance of the focal point to the transducer. On one end of the line (the closest point) the phase function is smooth because the distance versus time is also smooth. If the line were to be extended past this point, the distance to the transducer would start to extend again. It is this minimum distance which causes the smooth inflection point. The far point, however, represents an abrupt stop and reverse of the phase function. The resulting ‘kink’ in the curve causes many harmonics and noise. This is shown in FIG. 4, which is a graph 400 of a plot 430 showing a frequency power spectrum resulting from the phase function shown in FIG. 3. The x-axis 410 is frequency in kHz. The y-axis 420 is dB.

The goal of the methods presented below is to provide a framework to make arbitrary haptic curves with smooth phase functions to reduce undesired parametric audio. These do not represent all solutions but merely give some specific examples on how it may be done. Solutions may include subdividing an input curve into discrete points, but this is not necessary for all methods. Any solution which provides a continuous solution can also be sampled to produce a discrete solution.

I. Method 1: Direct Radius Smoothing

The phase function for a given transducer is directly proportional to the distance that transducer is from the focus. Therefore, we can smooth this function directly by choosing a path parameterization which gives a smooth distance versus time from a given transducer.

Figure 5:
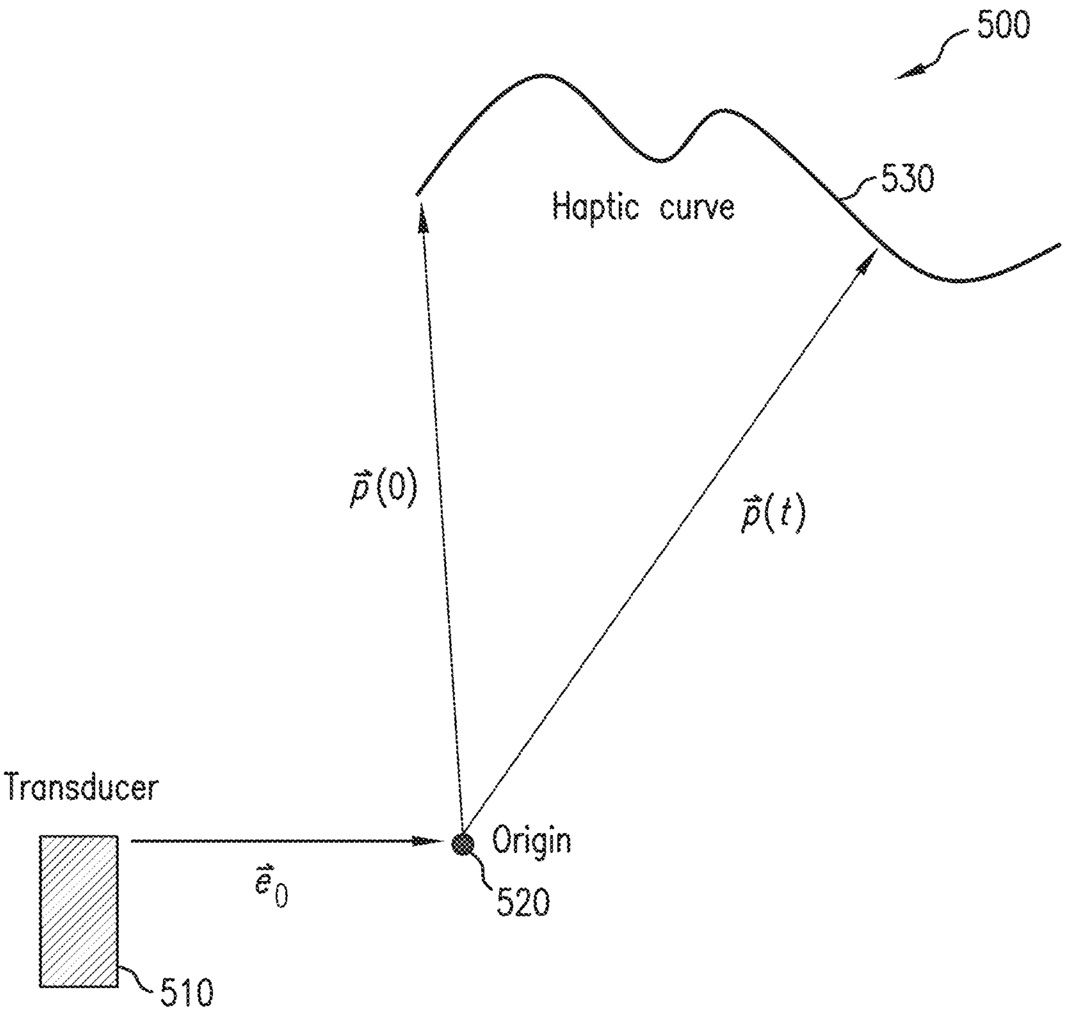
FIG. 5 shows a schematic of geometry for an arbitrary TPS curve and radius smoothing.

FIG. 5 shows a schematic 500 of geometry for an arbitrary TPS curve and radius smoothing. FIG. 5 includes a transducer 510, an origin point 520 and a haptic curve 530.

Using the geometry presented in FIG. 5, a haptic path is parameterized as the following, $$\vec{P}(t)=\vec{e}_0+\vec{p}(t)=(e_{0x}+f_x(t))\hat{x}+(e_{0y}+f_y(t))\hat{y}+(e_{0z}+f_z(t))\hat{z}.$$

The radius function is then, $$R(t)=\sqrt{(e_{0x}+f_x(t))^2+(e_{0y}+f_y(t))^2+(e_{0z}+f_z(t))^2}.$$

The goal is then to create a mapping function, g (t) which smooths the radius function. Using a single-frequency smoothing function, a mapping function g(t) would be, $$R(g(t))=(R_f-R_0)(0.5-0.5\cos(\omega t))+R_0=\sqrt{(e_{0x}+f_x(g(t)))^2+(e_{0y}+f_y(g(t)))^2+(e_{0z}+f_z(g(t)))_2}$$

While analytic solutions do not always exist, a simple solver should get close enough to be effective in most cases. This particular radius smoothing function expects $R_f$ to be larger than $R_0$ so an arbitrary curve would need to be divided into sections of monotonically increasing or decreasing sections. For the increasing sections, solve as normal. For the decreasing sections, it needs to be solved from the last point to the first and then read in reversed order.

The new curve would then be, $$\vec{P}(t)=\vec{e}_0+\vec{p}(g(t)),$$

using the selected transducer as the center of the coordinate or simply $\vec{p}$ (g(t)), from the origin.

Using this mapping function, one transducer ($\vec{e}_0$) 510 would have a perfect, single-frequency phase function. Other transducers would get increasingly less-perfect as their distances increase from the solved transducer. This method works well if the perfect-transducer for the solver is the farthest one from the haptic interaction.

Figure 6:
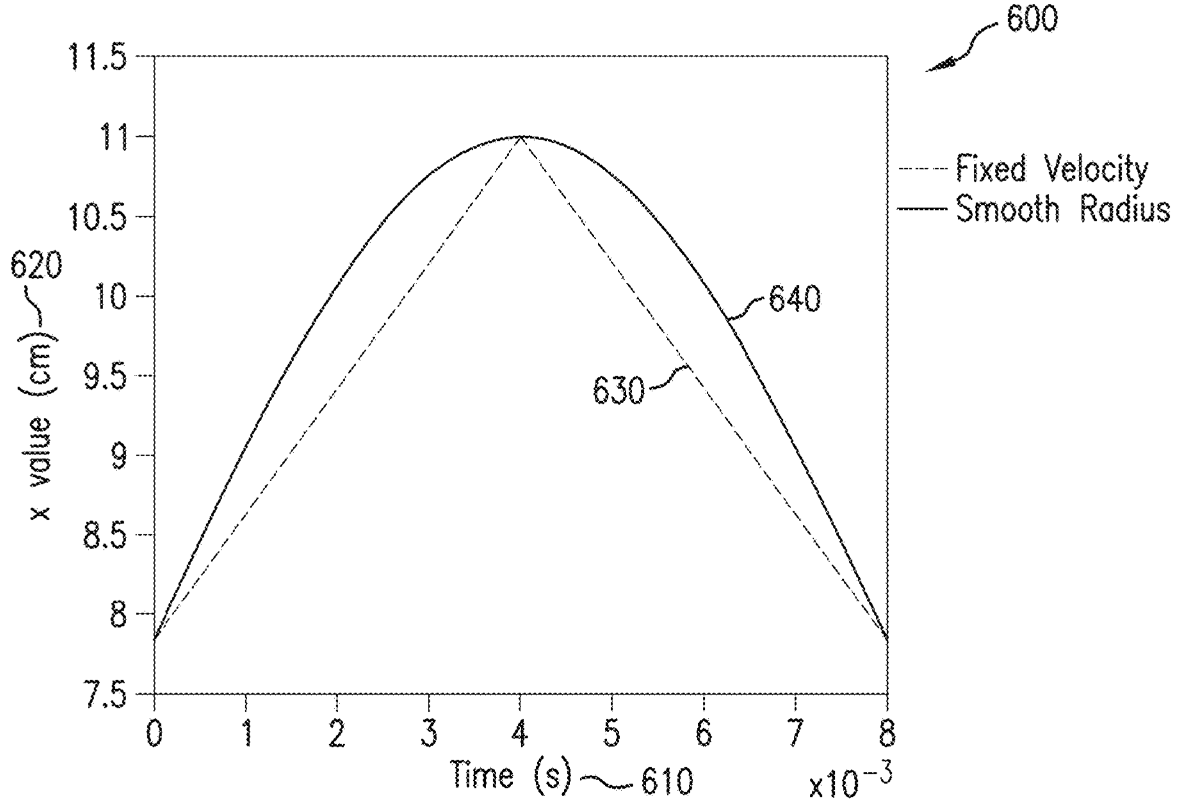
FIG. 6 shows a graph of applying direct radius smoothing.

FIG. 6 shows a graph 600 of the results of applying method 1 smoothing for a line extending from 8 cm to 11 cm in the x-axis extending from the center of an array. The x-axis 610 is time in seconds. The y-axis 620 is the x value in cm. The plot shows a fixed velocity 630 and smooth radius 640 lines. Because the fixed velocity line 630 is already at a spatiotemporal minimum at the start, it is not affected. The far end of the fixed velocity line 630 receives most of the adjustment.

Figure 7:
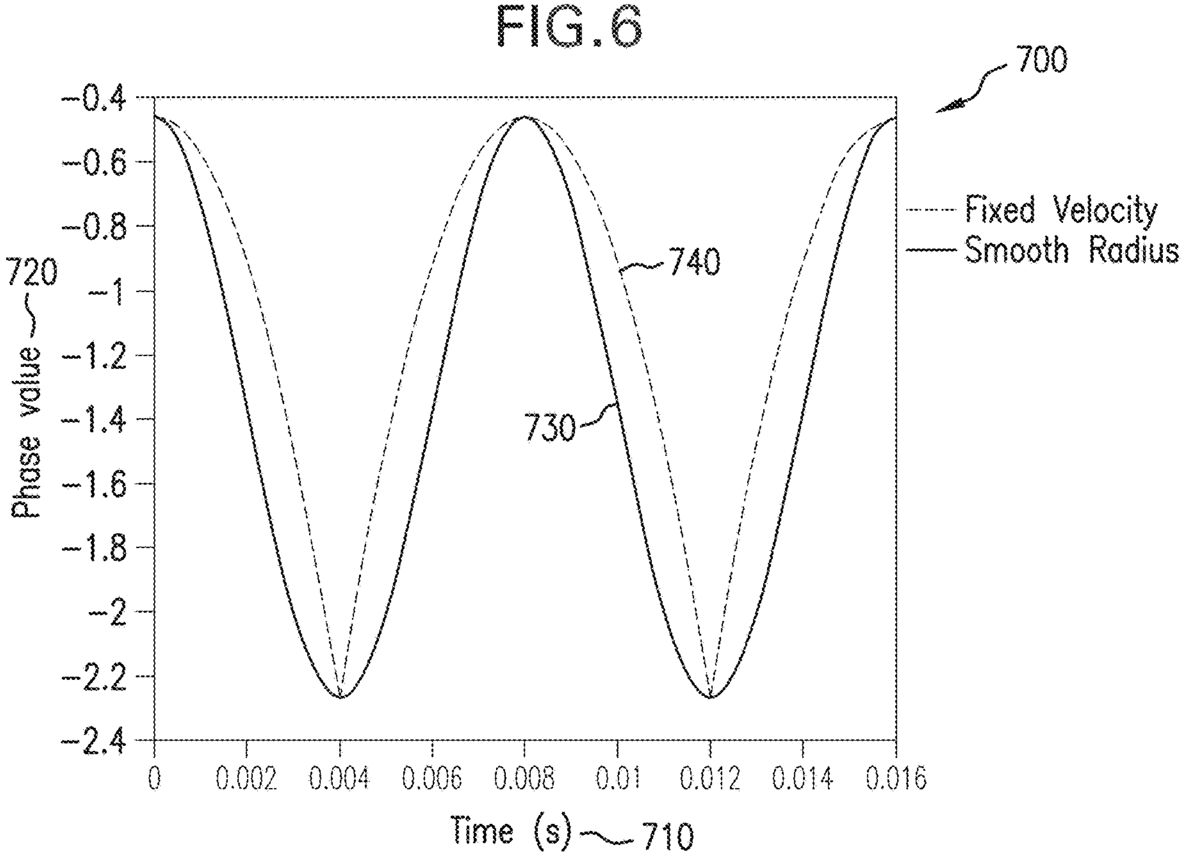
FIG. 7 shows a graph of a phase function of FIG. 6.

Shown in FIG. 7 is a graph 700 of a phase function for a transducer directly below one end of the line given in FIG. 6. The x-axis 710 is time in seconds. The y-axis 720 is phase value. The plot shows a fixed velocity 740 and smooth radius 730 lines.

Figure 8:
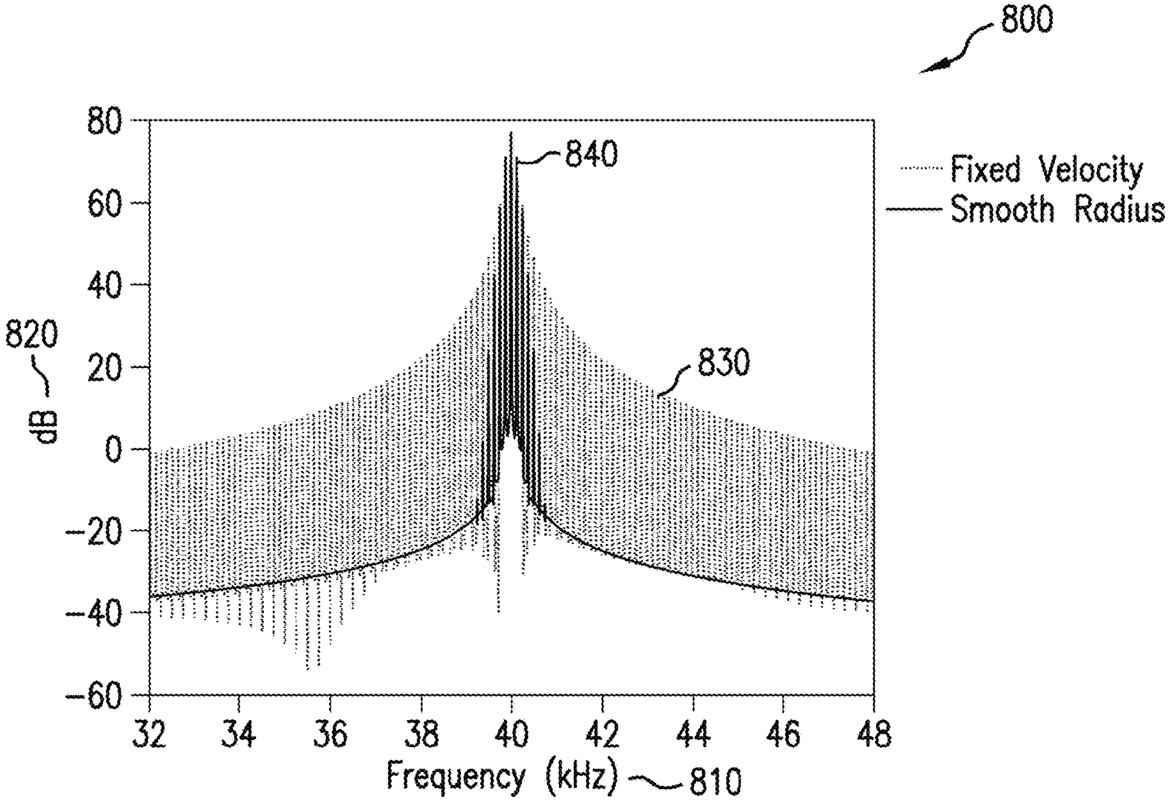
FIG. 8 shows a graph of a frequency power spectrum of FIG. 6.

Shown in FIG. 8 is a graph 700 of a frequency power spectrum for the two curves shown in FIG. 6. The x-axis 810 is frequency in kHz. The y-axis 820 is dB. The plot shows a fixed velocity 830 and smooth radius 840 lines.

With far fewer sidebands, the smoothed curve will produce less parametric audio.

While best implemented with foreknowledge of the desired path, this method can be implemented in real-time with a sample buffer where points are redistributed in blocks, dividing the curve into increasing and decreasing distance. A sufficiently large buffer would be needed so as to always include enough points to divide the space into distinct sections. This would be a function of the update rate and the size of the possible interaction regions.

II. Method 2: Temporally Smooth Points Distributions

An approximation of the previous method may be achieved by manipulating traversal rate on the path so that it has minimum velocity at sharp points which might cause noise. If $\vec{P}$ (t) represents a fixed-velocity parametrized TPS curve which starts and stops at a hard location (such as a line), a minimum-velocity curve would be, $$\vec{P}_{smooth}(t)=\vec{P}\left(.5-.5\cos\left(\pi\frac{t}{t_f}\right)\right)$$

where $t_f$ is the time representing the end of the curve. To return to the start of the curve the phase functions can be run in reverse. This results in a low-spread power spectrum.

Figure 9:
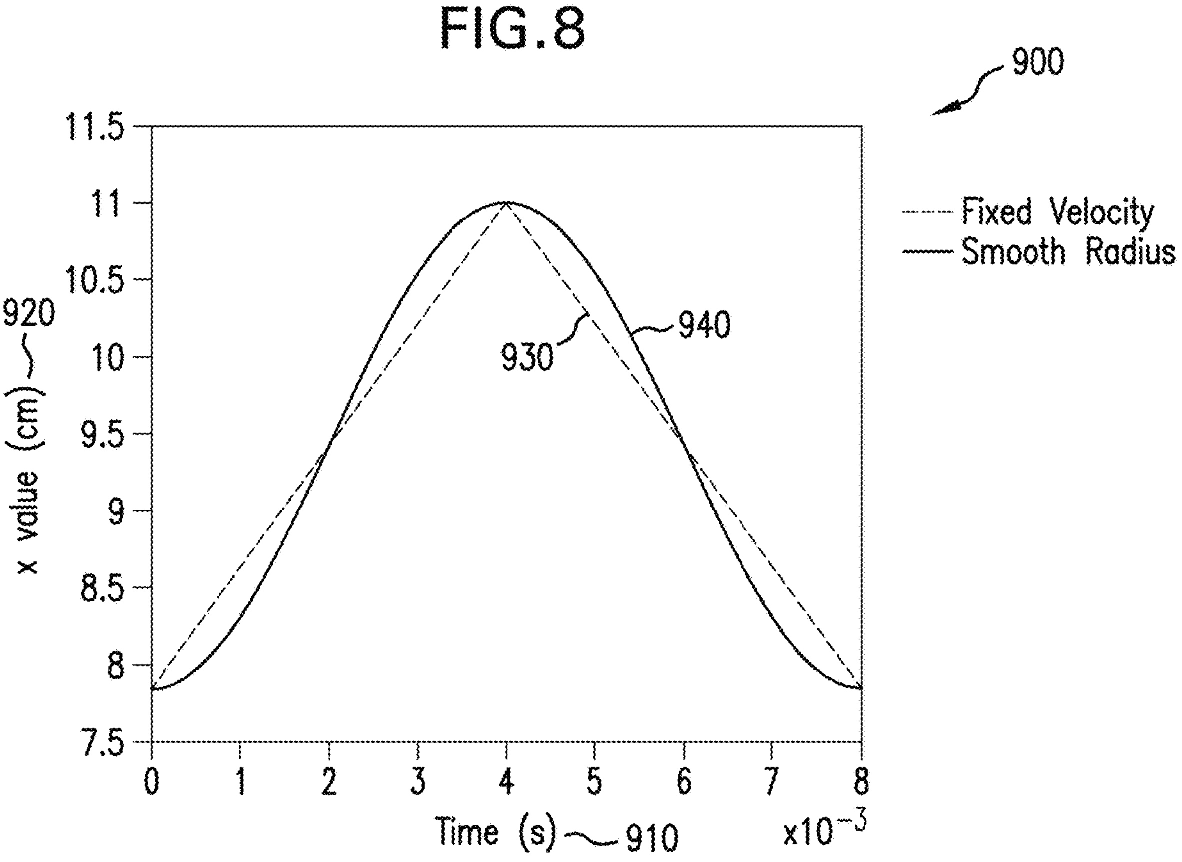
FIG. 9 shows a graph of applying temporally smooth points distributions.

FIG. 9 is a graph 900 showing the application of this method smoothing to a line extending from 8 cm to 11 cm in the x-axis extending from the center of an array. The x-axis 910 is time in seconds. The y-axis 920 is x-value in cm. The plot shows a fixed velocity 930 and temporally radius 640 lines.

This method is unaware that the start of the curve is already a spatiotemporal minimum and therefore smooths both ends. While not perfect for the presented transducer, the net result over all of the transducers in the array can be very similar in total to the other methods presented.

Figure 10:
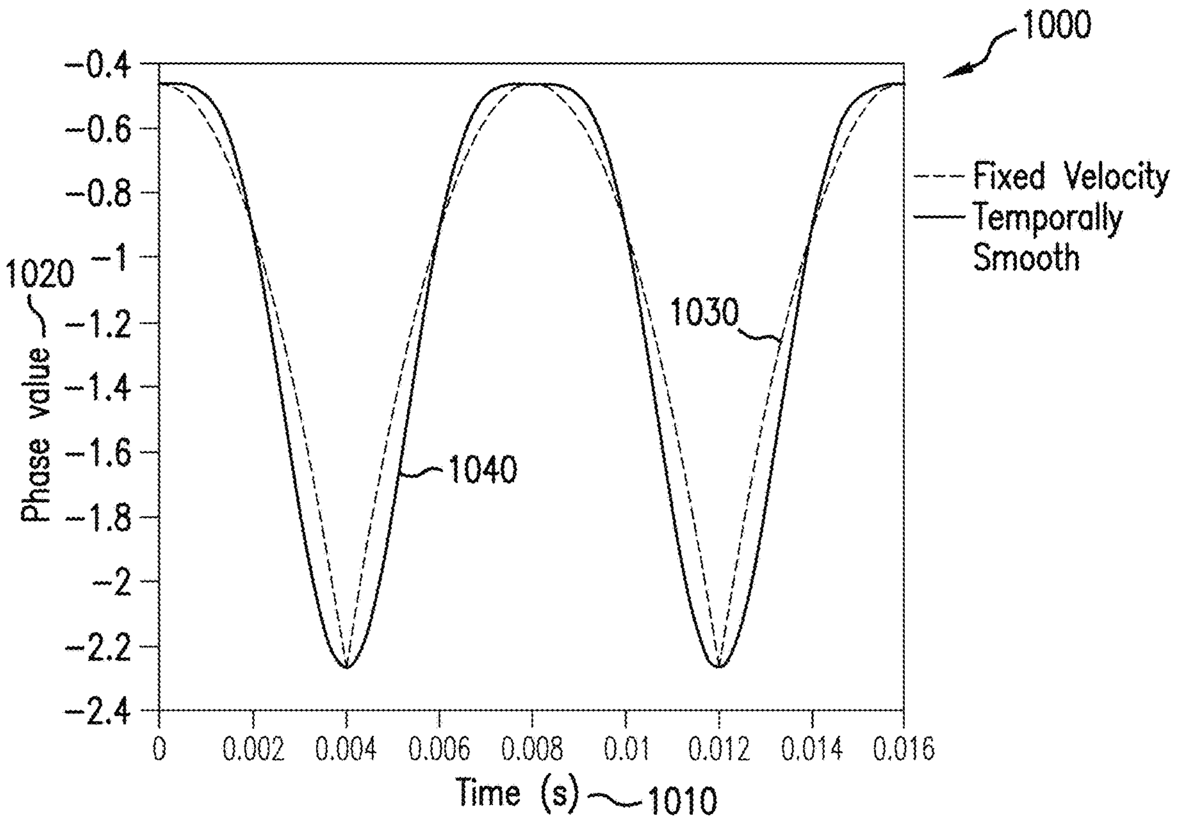
FIG. 10 shows a graph of a phase function of FIG. 9.

Shown in FIG. 10 is a graph 1000 of a phase function for a transducer directly below one end of the line given in FIG. 6. The x-axis 1010 is time in seconds. The y-axis 1020 is phase value. The plot shows a fixed velocity 1030 and temporally smooth 730 lines.

Figure 11:
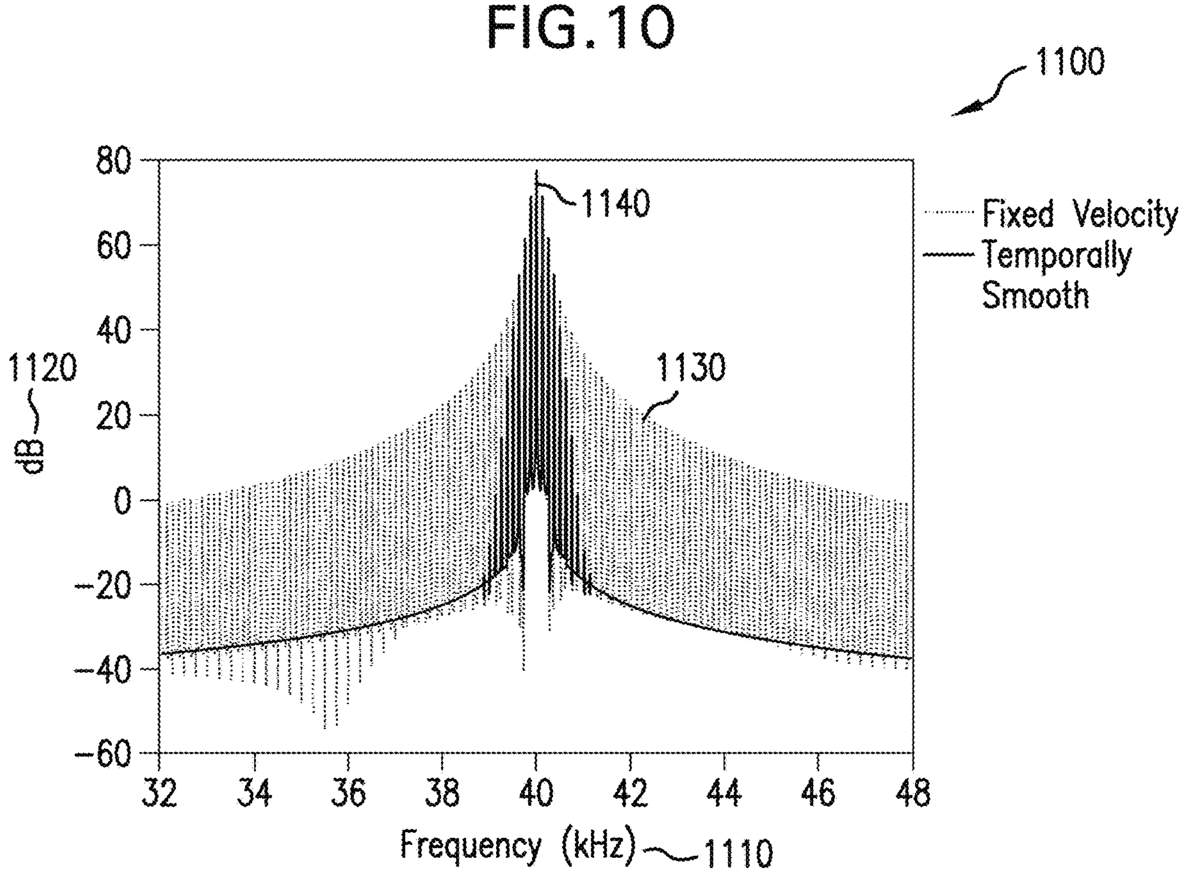
FIG. 11 shows a graph of a frequency power spectrum of FIG. 9.

Shown in FIG. 11 is a graph 1100 of a frequency power spectrum for the two curves shown in FIG. 6. The x-axis 1110 is frequency in kHz. The y-axis 1120 is dB. The plot shows a fixed velocity 1130 and smooth radius 1140 lines.

This can be implemented in real-time with a sample buffer or with sub-sampling. A sample buffer would have to look ahead for sharp transitions and redistribute to first accelerate to get ahead in space and then decelerate into those points. Sub-sampling would be done by assuming each point is itself a "sharp" transition and distributions would follow a smooth function (like above) in between on a direct-line path. This should be especially effective if the accepted point rate is at 400 Hz or less with an update rate of 40 kHz or higher.

III. Method 3: Spatial Filtering

The radius function for an arbitrary haptic path is given by:

$$R(t)=\sqrt{(e_{0x}+f_x(t))^2+(e_{0y}+f_y(t))^2+(e_{0z}+f_z(t))_2}.$$

From this equation, it is clear that spatial functions ($f_x$(t), etc) with high-frequency content will directly translate to high-frequency content in R (t). If we filter the spatial functions directly, R (t) and therefore the phase function for the curve, will have a minimum of high-frequency content.

This can be accomplished with any number of standard frequency filtering approaches, both pre-processed and real-time. Processing continuous curves can be done with analogue filter implementations. Curves divided into a series of points can be filtered using traditional digital methods such as infinite impulse response (IIR) and finite impulse response (FIR) filters. Each dimension at a time must be filtered individually.

Frequency filtering approaches fall into two categories: ones involving feedback/feedforward called infinite impulse response (IIR) and ones without feedback called finite impulse response (FIR). IIR filtering requires less buffering and computation cost but often introduces phase delay. FIR filtering can be phase-perfect but requires a buffer equal to the size of the coefficients which can get large for low-frequency filtering.

Figure 12:
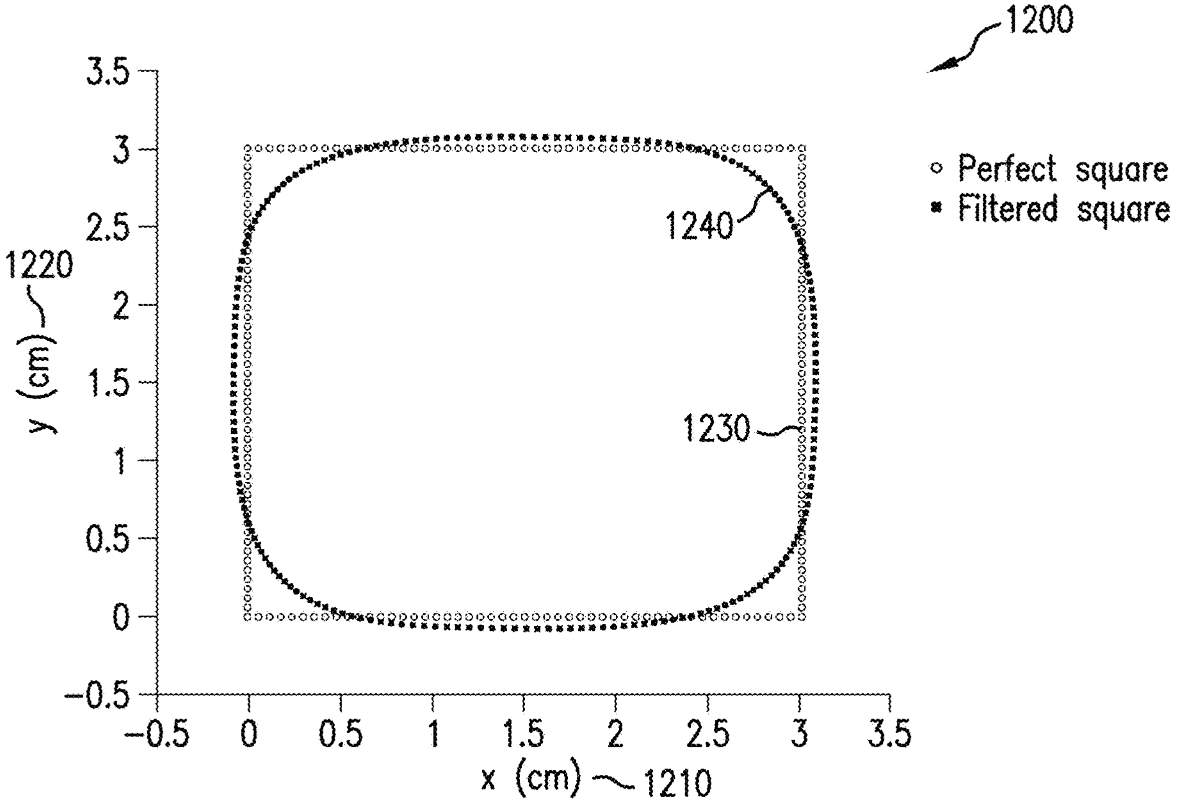
FIG. 12 shows a graph of a square curve filtered by a $2^{nd}$-order Butterworth filter.

FIG. 12 shows a graph 1200 of 3 cm 200-point square curve 1230 filtered by a $2^{nd}$ order Butterworth (IIR) filter at sampled at 400 Hz (200 Hz). The x-axis 1210 is x in cm. The y-axis 1220 is y in cm. Shown is one loop of the steady-state response. The resulting curve 1240, while not identical to the input curve, is largely indistinguishable using 40 kHz ultrasound due to focusing resolution.

Figure 13:
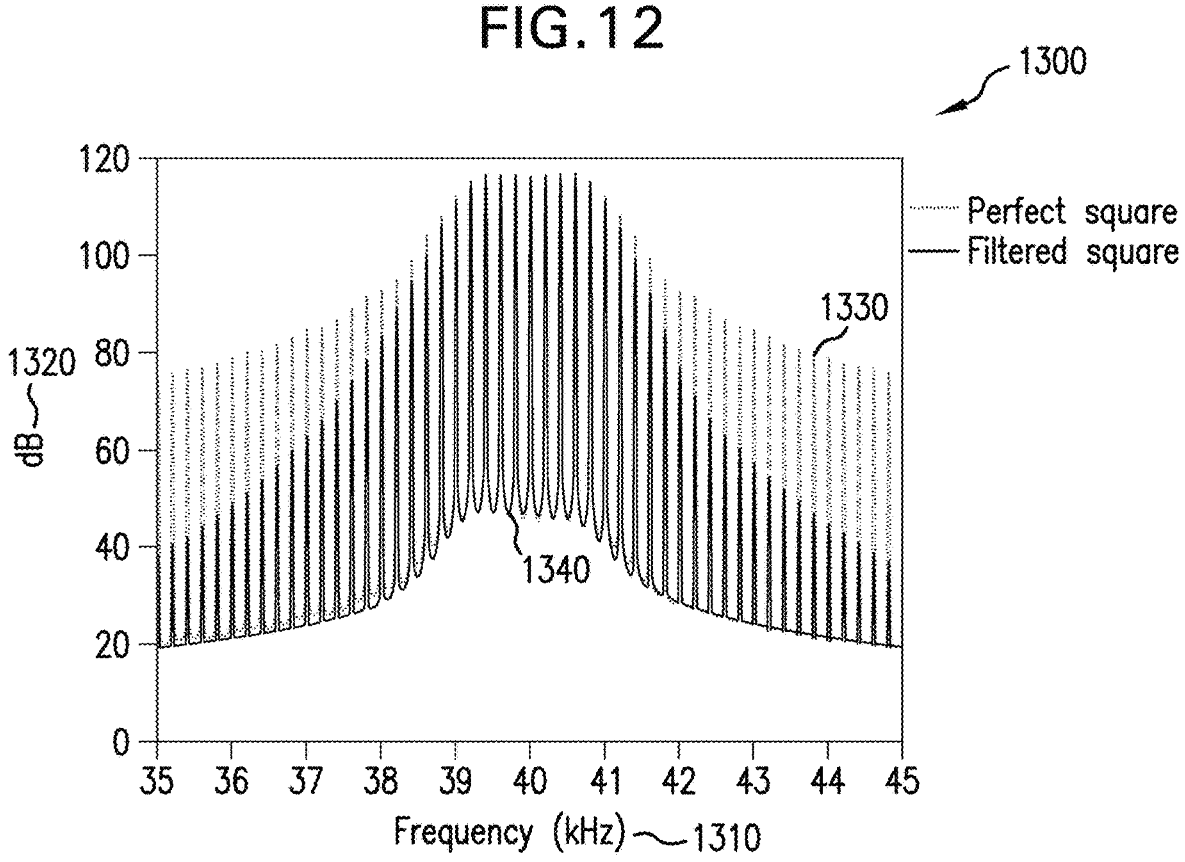
FIG. 13 shows a graph of a frequency power spectrum of FIG. 12.

FIG. 13 shows a graph 1300 of the frequency power spectrum for the two curves shown in FIG. 12. The x-axis 1310 is frequency in kHz. The y-axis 1320 is in dB. The plot shows a perfect square 1330 and a filtered square 1340. This is the absolute sum of the output of 256 individual transducers located at 1 cm pitch in a 16×16 array. In this case, the data presented represents the sum of all the transducers placed at 1 cm pitch in a 16×16 square array.

Figure 14:
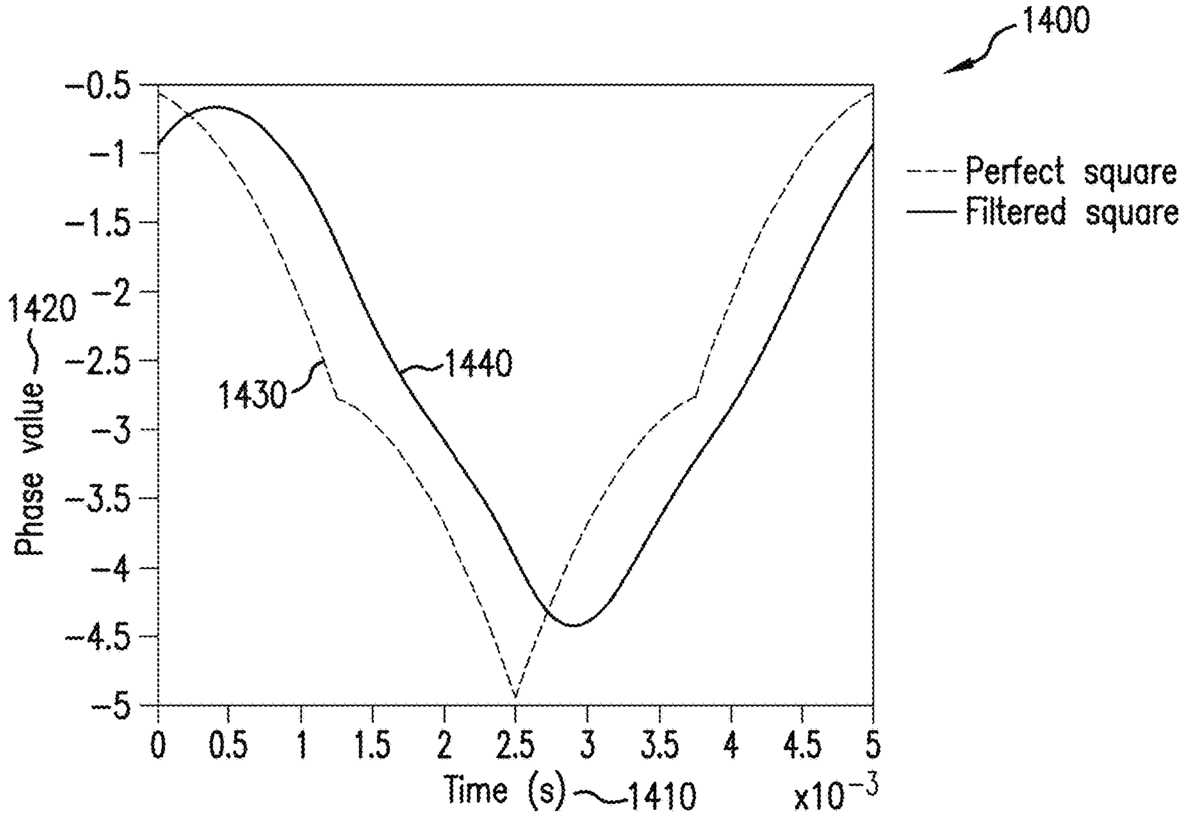
FIG. 14 shows a graph of a phase function of FIG. 12.

FIG. 14 shows a graph 1400 of the phase function for a transducer located near the origin in FIG. 12. The x-axis 1410 is time in seconds. The y-axis 1420 is phase value in dB. The plot shows a perfect square 1430 and a filtered square 1440. The smoothing of the phase function for a transducer located under one corner of the square is shown in FIG. 14.

Filtering can be adjusted to achieve the desired balance between path reproduction accuracy and audio reduction.

IV. Method 4: Spatial Approximations (Fourier, Splines, Polynomials, etc.)

Any input path or series of points representing a path can be approximated with smooth path using curve fitting techniques.

For example, a haptic path is often repeated several times in order to create a haptic sensation. If a complete loop is buffered in advance, this nicely encapsulates a repetitive sequence and can be expressed as a Fourier series. Being directly related to the frequency domain, increasing orders of approximation directly relates to the trade-off between accuracy and unwanted audio. The Fourier series approximation is given by, $$f(x) = \frac{1}{2}a_0 + \sum_{n=1}^{\infty} a_n\cos(nt) + \sum_{n=1}^{\infty} b_n\sin(nt),$$

where, $$a_0 = \frac{1}{\pi}\int_{-\pi}^{\pi} f(t)dt,$$

-continued $$a_n = \frac{1}{\pi}\int_{-\pi}^{\pi} f(t)\cos(nt)dt,$$

$$b_n = \frac{1}{\pi}\int_{-\pi}^{\pi} f(t)\sin(nt)dt,$$

where the integrals are taken over one period. Each dimension would need to be approximated separately.

Figure 15:
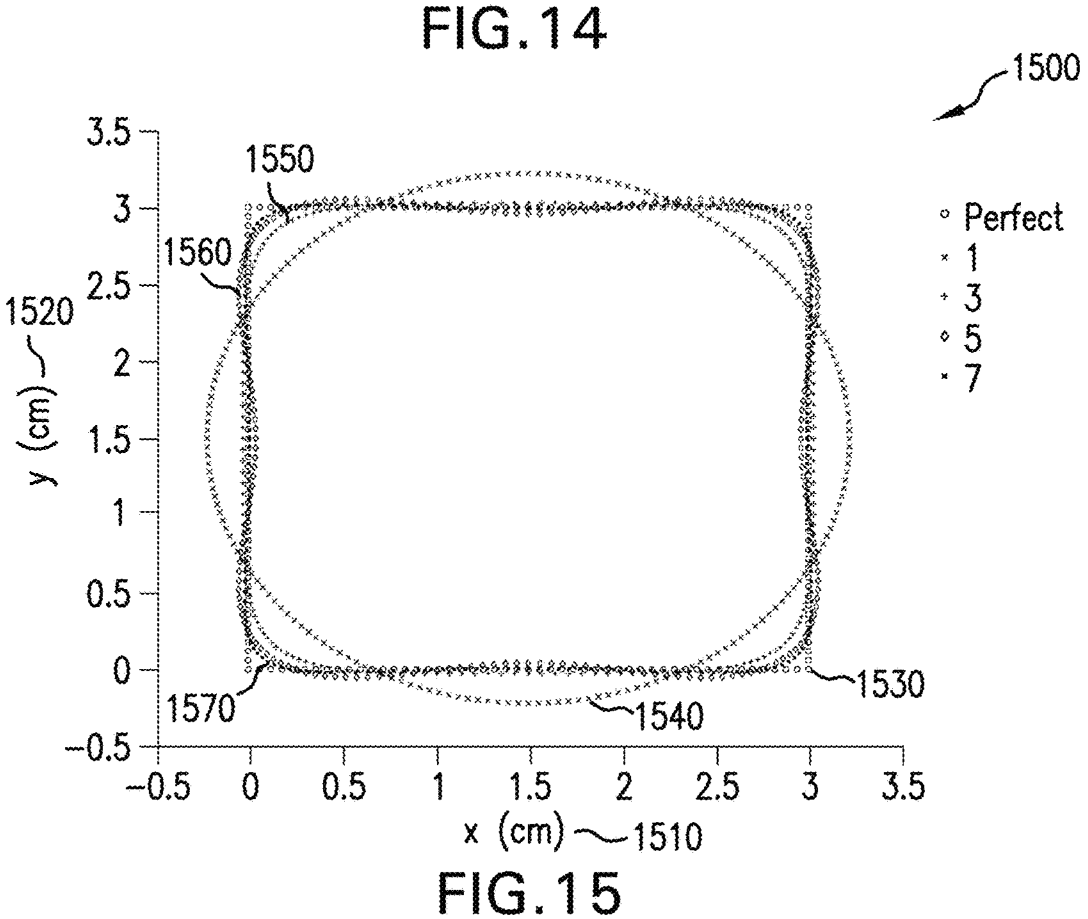
FIG. 15 shows a graph of an example of a square with increasing orders of Fourier series expansion.

FIG. 15 is a graph 1500 showing an example of a 3 cm square with increasing orders of Fourier series expansion. The x-axis 1510 is x in cm. The y-axis 1520 is y in cm. The plots 1530, 1540, 1550, 1560, 1570 respectfully represent the maximum order included in each expansion of perfect, 1, 3, 5 and 7.

Figure 16:
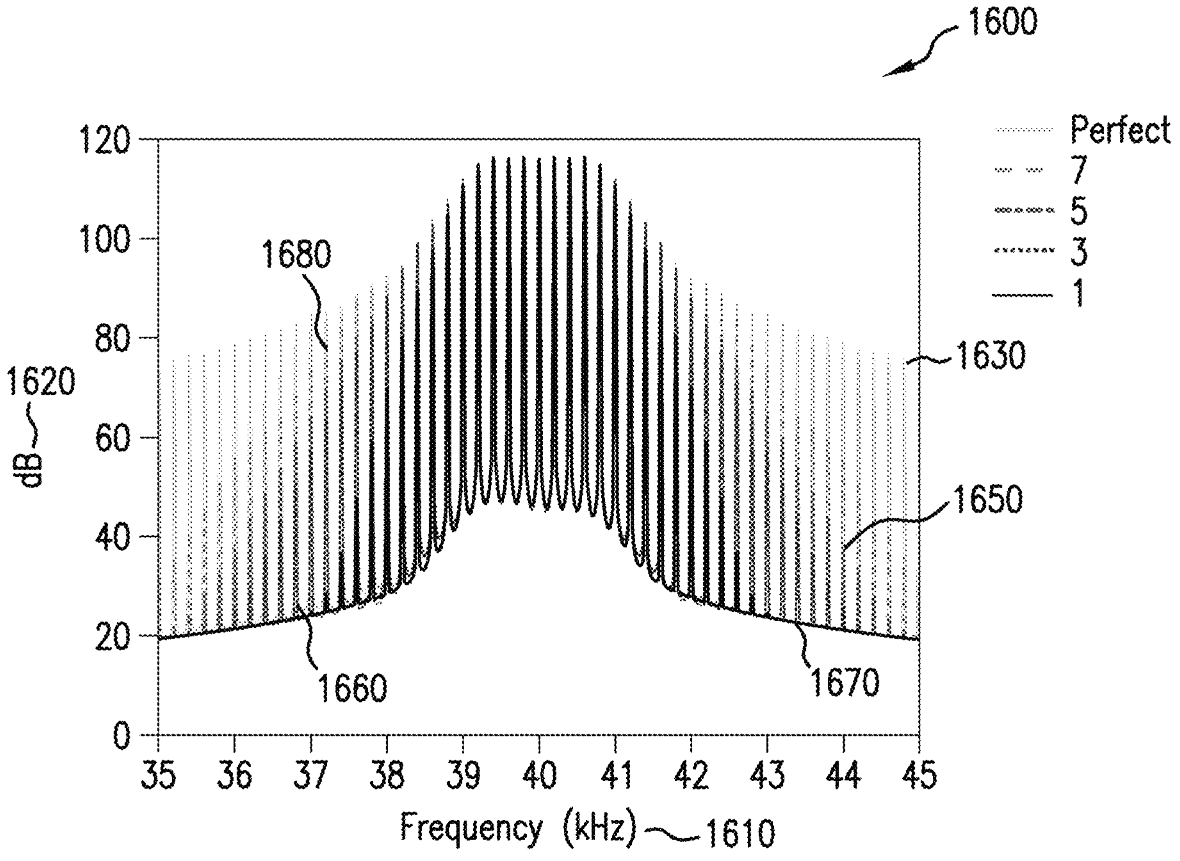
FIG. 16 shows a graph of a frequency power spectrum of FIG. 15.

FIG. 16 shows a graph 1600 of the frequency power spectrum for the curves shown in FIG. 15. This is the absolute sum of the output of 256 individual transducers located at 1 cm pitch in a 16×16 array. The x-axis 1610 is frequency in kHz. The y-axis 1620 is dB. The resulting power spectrums 1630, 1640, 1650, 1660, 1670 show how increasing the order of the approximation (respectively perfect, 7, 5, 3, 1) yields more sidebands and more audio as a result of better path reproduction. The approximation would need to be updated every time the haptic loop is updated. Transitioning between them would need another method discussed in this document to avoid high-frequency jumps.

Polynomial fits are another class of smooth functions which can easily be fit to a set of input points. Critical points can be chosen in advance or in a buffered or sub-sampled signal and a fitting routine such as least-squares can be used to fit a low-order polynomial. Selecting critical points with sudden stops or high curvature will likely be the most effective. The higher-order used, the more accurate the curve will be to the input points, but the higher curvature will allow for higher frequency content. Essentially non-oscillatory (ENO) polynomials may also be used to counter this through the weighted selection of high-order polynomial interpolations which are representative yet minimize unwanted high-frequency content. If desired, the number of critical points could relate to the order of the polynomial fit in order to include those points exactly (a determinate system). If implemented real-time, the fit would need to update smoothly as new critical points are determined.

Splines offer yet another curve approximation system which can emphasize smoothness and low curvature. As with other methods, the input could be critical points from a sub-sampled system or chosen algorithmically from an input buffer.

V. Additional Disclosure

As far as is known, no attempt has ever been made to adjust curve parameterization (point spacing/location) in order to improve unintended audio. The idea here is recognizing the direct relationship between spatial spectral content and parametric audio.

These techniques are much easier to implement at a software level versus direct filtering at the firmware level. These techniques are easier to tune to adjust accuracy versus audio.

Additional disclosure is as follows:

1. A method comprising:

creating haptic feedback using ultrasound comprising the steps of:

producing an acoustic field from a transducer array having known relative positions and orientations;

defining a focus point having a known spatial relationship relative to the transducer array defining a path having a known spatial relationship relative to the transducer array in which the focus point will translate;

moving the focus point near the path so as to produce little audible sound.

2. The method as in paragraph 1, further comprising:

moving the focus point near the path in a method selected to produce a smooth phase function for a transducer.

3. The method as in paragraph 1 wherein the focus point moves near the path to produce a phase function with reduced high-frequency content for a transducer.

4. The method as in paragraph 1, wherein the focus point moves near the path so as to produce a smooth radius versus time from a transducer.

5. The method as in paragraph 1, wherein the focus point moves so that it spends more time near locations in the curve with tight curvature or end points.

6. The method as in paragraph 1 wherein the path is filtered to reduce high-frequency spatial content.

7. The method as in paragraph 1 wherein the path is approximated by approximation functions using a second path with reduced high-frequency content.

8. The method as in paragraph, 1 wherein the path is subdivided into multiple focal points.

9. The method as in paragraph 8, wherein the multiple focal points are distributed along the path to produce a smooth phase function for a transducer.

10. The method as in paragraph 8, wherein the multiple focal points are distributed along the path to produce a phase function with reduced high-frequency content for a transducer.

11. The method as in paragraph 8, wherein the multiple focal points are distributed along the path so as to produce a smooth radius versus time from a transducer.

12. The method as in paragraph 8, wherein the multiple focal points are distributed along the path such that the multiple focal points are more closely distributed at locations with tight curvature or end points.

13. The method as in paragraph 8, wherein spatial locations of the multiple focal points are filtered to remove high-frequency content.

14. The method as in paragraph 8, wherein the path is approximated by approximation functions using functions with reduced high-frequency content.

[Docket 81]

(2) Dynamic Transducer Activation Based on User Location Information for Haptic Feedback

I. Feed-Forward Input Generation for a Desired Output Via Linear Algebra

The impulse response of a system can be used to predict its output for a given drive by use of convolution, $$V_{out}(t)=V_{in}(t)*h(t),$$

where $V_{out}(t)$ is the output of the system, $V_{in}(t)$ is the driving signal, h(t) is the system's impulse response, and * is the convolution operator. One way to organize a system is to divide the past of the system into segments each with fixed time interval T. Past drive signals are grouped into equal-time segments and designated by the number of periods in the past they represent. If these signals are $D_n$ where n represents the number of periods in the past, this results in:

$$V_0(t)=D_0(t)*h(t)+D_1(t)*h(t-T)+D_2(t)*h(t-2T)+\ldots \quad (1)$$

where $V_0$ and $D_0$ represent the output and drive of next cycle to be produced and all other terms encapsulate the history of the system. The time offsets may be foregone by writing this as an index, $h_n=h(t-nT)$ The notation may be simplified by denoting vectors $D=\lfloor D_1, \ldots D_n\rfloor$ and $h=\lfloor h_1, \ldots, h_n\rfloor$, where each entry in the vector is the time-series data for the drive and impulse response respectively. The convolution operator would then first convolve then add as a vector product. Equation 1 can then be written as, $$V_0=D_0*h_0+D*h,$$

and the inverse problem which we are trying to solve is, $$D_0=(V_0-(D*h))^{*-1}h_0,$$

where $*^{-1}$ is the deconvolution operator.

This solution may be expanded to an array of coupled systems by measuring the impulse response of one element when another is driven. Take, for example, two elements A and B. The impulse response of A when B is driven is defined as $h_{BA}$ and the opposite case of response of B when A is driven as $h_{AB}$. The traditional impulse response in this notation would be $h_{AA}$ and $h_{BB}$ respectively. The above analysis reduces to a system of two equations, $$V_{A0}=D_{A0}*h_{AA0}+D_A*h_{AA}+D_{B0}*h_{BA0}+D_B*h_{BA},$$

$$V_{B0}=D_{B0}*h_{BB0}+D_B*h_{BB}+D_{A0}*h_{AB0}+D_A*h_{AB},$$

where the 0 subscripts represent the next cycle for the various parameters, $D_a$ and $D_B$ are the vectors of time-series driving data analogous to D above, and $V_{A0}$ and $V_{B0}$ are the output of each element. When $V_{A0}$ and $V_{B0}$ are specified this reduces to an indeterminate system in which a solution can be approximated. This technique can be expanded to an arbitrarily sized array of elements. This is the most general form of the invention. This formula calculates the necessary drive ($D_0$) for a desired output ($V_0$) given the history of the drive contained in D*h. Presented below are methods to simplify the deconvolution process under certain conditions.

While convolution calculations are straightforward, the inverse problem is often difficult. Deconvolution algorithms can be computationally challenging and can yield oscillatory or unstable behavior. A major simplification can be made when working with high-Q resonant systems by using the convolution theorem. This states that the Fourier transform of two convolved signals is the multiplication of their individual Fourier transforms. In a resonant system, the Fourier transform the impulse response is dominated by the component at the resonant frequency. If the driving signal are kept largely monochromatic, the system may be reduced largely to algebra. In the above notation this takes the form, $$\mathcal{F}(V_0)=\mathcal{F}(D_0*h_0+D_1*h_1+D_2*h_2+\ldots)\approx A(V_0)=A(D_0)\cdot A(h_0)+A(D_1)\cdot A(h_1)\cdot A(D_2)\cdot A(h_2)+\ldots, \quad (2)$$

where $\mathcal{F}$ denotes the Fourier transform, and A is an operator which returns the complex Fourier component at the resonant frequency of the element. By specifying the desired output in terms of the resonant frequency complex Fourier component ($A(V_0)$), each term on the right are simply complex values, and the system is now algebraic. The single-element control function in this notation reduces to:

$$D_0=(V_0-(D\cdot h))/h_0. \quad (3)$$

In this case both the output ($V_0$), drive ($D_0$), and first-period impulse response ($h_0$) would be complex numbers representing the Fourier component at the resonant frequency. D and h are vectors containing the time shifted impulse response and drive Fourier components respectively. The number of historical data points to include in any one timestep is dependent on the desired accuracy of the drive as well as the computational power available. The complex output is relatively easy to realize in practice and will be covered below.

An array of coupled elements can be similarly simplified. Given an array with m elements the equation 3 can be written as, $$V = \begin{pmatrix} V_1 \\ \vdots \\ V_m \end{pmatrix},\quad h_n = \begin{pmatrix} h_{11n} & h_{21n} & \cdots & h_{m1n} \\ h_{21n} & h_{22n} & \ddots & \vdots \\ \vdots & \ddots & \ddots & \vdots \\ h_{m1n} & \cdots & \cdots & h_{mmn} \end{pmatrix},\quad D_n = \begin{pmatrix} D_{1n} \\ \vdots \\ D_{mn} \end{pmatrix},\quad D_0 = h_0^{-1}\left(V - (h_1 h_2 \cdots h_n)\begin{pmatrix} D_1 \\ D_2 \\ \vdots \\ D_n \end{pmatrix}\right), \tag{4}$$

where n refers to the given period delay offset, the numbered indexes in the impulse response are the impulse on the second number with the first number driven (as above), and $h_0^{-1}$ is the inverse of the first-cycle impulse response matrix. The output of this, like equation 2, is an array of complex driving coefficients for the m transducers given the desired m outputs in V.

Another simplification of the above method can be accomplished through a recursive definition of the impulse response function. In many systems, the impulse response function can be approximate by purely exponential decay. In this case, the total contribution from the previous activations can be approximated by, $$\sum_{n=1}^{\infty} D_n \cdot h_n \approx D_1 \cdot h_1 + \alpha \sum_{n=2}^{\infty} D_n \cdot h_n,$$

where α is an experimentally derived constant. Each cycle the previous contribution is multiplied by a and summed with the new cycle. In this way, only one multiplication is necessary each cycle to calculate the complete historical contribution. This simplification works very well for systems well described by a damped harmonic oscillator. This can be applied on an element-by-element basis for an array system but tends to only work well if the cross-coupling is minimal as the first-order nature of this recursive filter does not pass ringing. A hybrid recursive filter can be made by including a fixed number of cycles using the previous explicit method and then lumping the remainder into a recursive term. If the bulk of the ringing behavior can be captured in the fixed cycles which are explicitly calculated, the remainder should be well described by a recursive approach.

Resonant systems can display non-linear behavior near the resonant frequency. This can manifest as a nonlinearity in the amplitude response. As a result, the impulse response function changes as a function of current drive level. This can cause the estimation of the previous contributions (Dh) to be inaccurate at high drive levels. To compensate for this, the impulse response matrix must become a function of drive level. For each element the impulse response can be measured for a given amplitude, h(A). Using this notation, the driving activation coefficients can be calculated using, $$D_0 = h_0^{-1}\left(V - \sum_{n=1}^{n_{max}} h_n(A_n) \cdot D_n\right) \tag{5}$$

Where $h_0^{-1}$ is the small-amplitude impulse response. For the next period the amplitude(s) used to modify h can be estimated using the Do just derived, $$A_0 = h_0 \cdot D_0 + \sum_{n=1}^{n_{max}} h_n(A_n) \cdot D_n,$$

where $A_n$ are calculated from previous time steps (already calculated in 2 and can be reused). In this notation $D_n$ and $A_n$ are the drive and amplitude at n periods in the past and $h_n$ is the time-shifted impulse response for that amplitude. In our notation, for the next timestep, this would be incremented to $A_1$ and used within the historical term in equation 5 above.

The methods presented above rely on an accurate impulse response. In a real system, this can change under various environmental conditions including temperature, altitude, age, and many others. Accuracy of the methods depend on tracking the most important factors and adjusting the impulse responses accordingly. This can be implemented using a large store of recorded impulse responses which are then accessed based on external sensors or clocks. Alternatively, a different resonant driving frequency can be used which could restore accuracy to the impulse response as most decay and cross talk mechanisms will remain largely similar even if the resonant frequency of the system changes. In another arrangement, a mathematical model of the change in impulse response can be implemented in the system to change the stored impulse response over time and function. In yet another arrangement, the device can be setup to measure the impulse response at certain times such as start-up or during periods of minimal output to re-adjust the internal tables. This could be accomplished electrically via an impedance sweep or with some other electrical measuring method. Alternatively, feedback from an external measurement device (such as a microphone for an ultrasonic transducer system) could be used to update tables.

The feed-forward control scheme can introduce some high-frequency components to the drive which could be detrimental in certain applications (high-power airborne ultrasound for instance). In this case there are a number of possible solutions to limit the high-frequency components while still retaining the precise control of feed-forward. One simple method is to simply apply IIR low-pass filters to the output drive coefficients of equation 1 (one for each of the real and imaginary components). For each cycle, the previous cycle's output is the output of the filter, then a new drive term is calculated with equation 1, and that is filtered, and so on. Another option is a simple comparison of the change of D from one cycle to the next and limit this to a certain magnitude (point by point), this limited D is the input to the history term in the next cycle. This is effectively a low-order low-pass filter.

The filter, or magnitude limiter, can adapt to the input, by analyzing the bandwidth of the input and applying a filter which starts to attenuate based on that value. For the simple case of a magnitude-change filter, a running max change from the previous n input samples could be stored and that could be used as the limiting change. In that way if the input is requesting high-frequency changes, high-frequency changes are passed, but if the input is slow and smooth, the output coefficients are also limited in their rate of change. In another implementation, the input signal could be analyzed for frequency content (say with a series of band filters) and an adjustable IIR filter applied to each driving term based upon the input frequency analysis. The exact relationship between the content of the input and filtered output can be adjusted to optimize accuracy (by passing all frequencies) versus noise (heavily filtering).

Examples shown in the figures are generated using a 2-level PWM interpretation of the coefficient output equation 1. This is done simply by matching the Fourier component of PWM to the desired output by adjusting the phase and width of the pulse. When an amplitude requested exceeds what is possible by the drive, phase can still be preserved by amplitude is kept at maximum duty cycle (50%). This clipping of amplitude does not impede the method and is implemented in the simulations above. Despite this being the only type of simulation shown, the invention presented here is not limited to a 2-level PWM drive. Any drive system will work from PWM to analogue. The only requirement is that the drive for each resonant-frequency-period have a Fourier component at that frequency which matches in the output from equation 1. The cleaner the drive is from a frequency perspective, the better the system will perform. This can be achieved by switching many times per cycle, many different voltage levels available, or a full high-bandwidth analogue drive.

Feedback from an external pickup could also be incorporated.

Feed-forward drive allows for the precise control of resonant systems.

Possible uses include:

1. Controlling arrays of resonant ultrasonic transducers for parametric audio. By more accurately controlling each element, the quality of reproduction will increase as well as being able to more carefully steer and control the ultrasound field.
2. Controlling an array of resonant ultrasonic transducers for haptic feedback. Better control of the amplitude and phase will allow for better focus control (smaller focus, cleaner modulation) and less unwanted audio
3. Controlling one or an array of ultrasonic transducers for ranging. Distance estimates involve encoding a 'key' into the ultrasound output on top of either amplitude or phase. In the simplest application, this would simply be a 'pulse' which turns on and off. In other applications where the transducer is continually producing output, the key could be a deliberate phase shift. The sharper the key is in time, the more accurate the range calculation is on reception. The method presented allows for sharper transitions than what is capable in standard control.
4. PWM control of motors with resonant behavior.
5. Control of resonant loudspeakers.

Figure 17A:
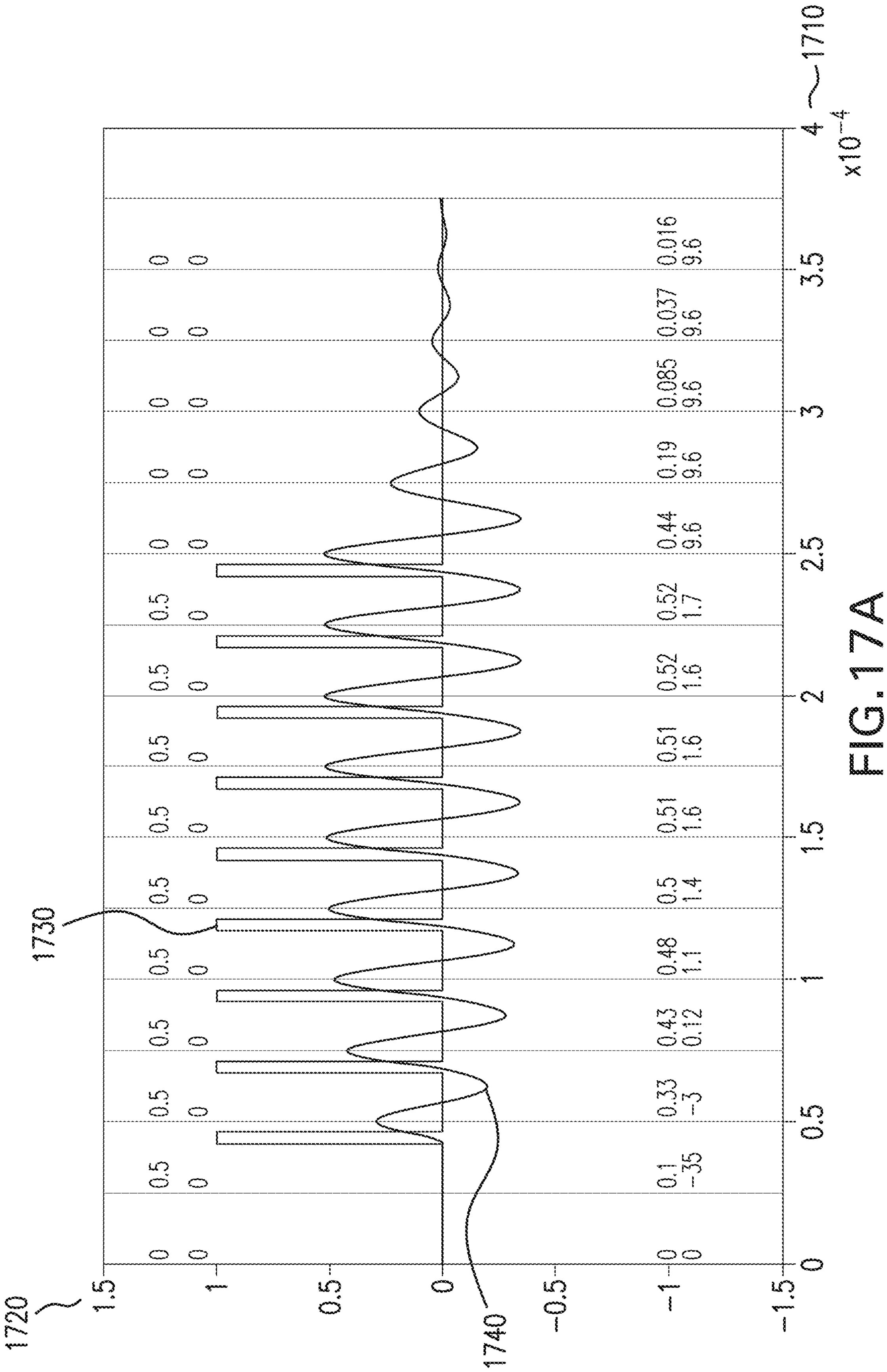
FIGS. 17A and 17B show graphs of a model demonstration of a basic drive versus feed-forward control.
Figure 17B:
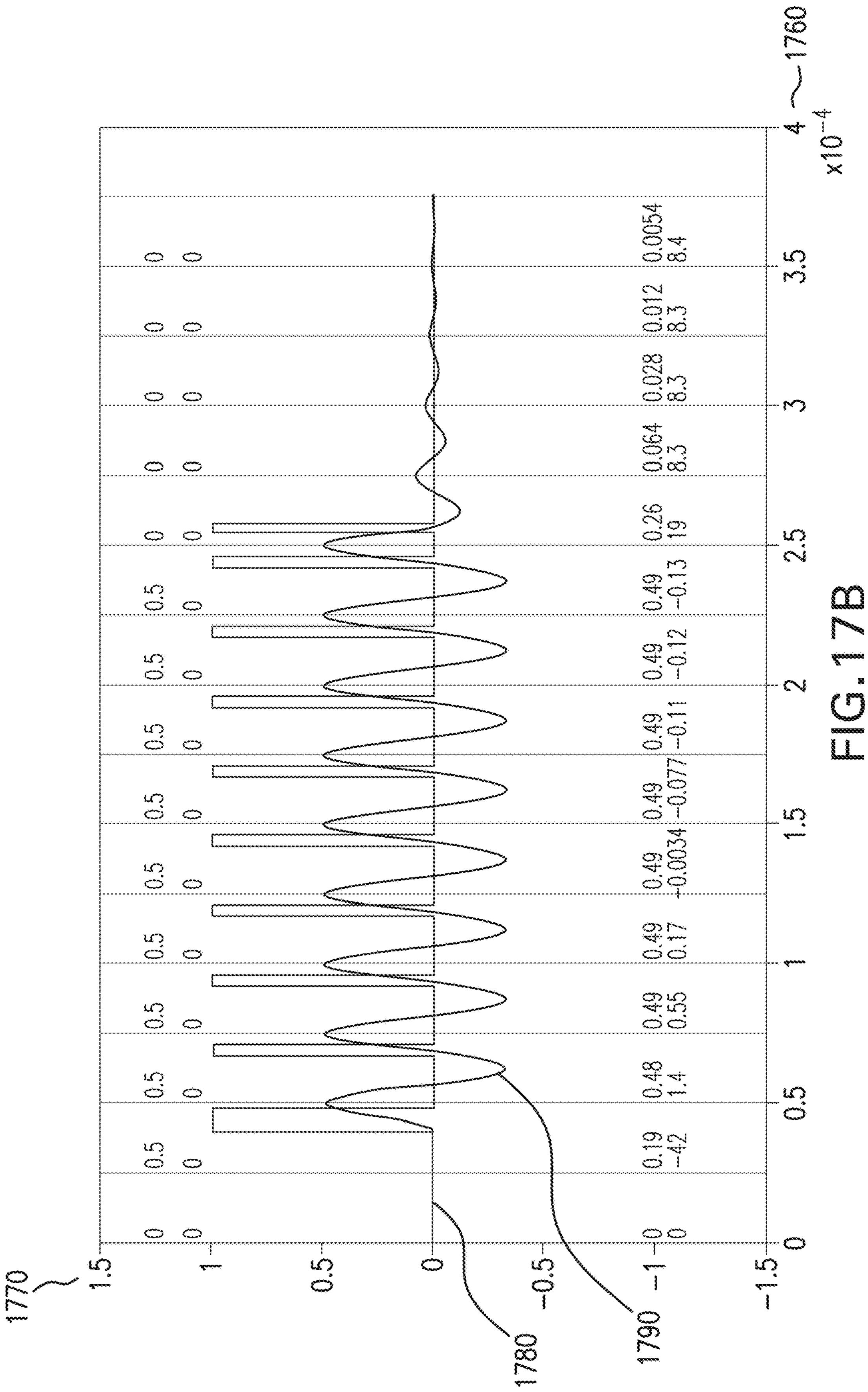

FIGS. 17A and 17B show a pair of graphs 1700, 1750 that are a simple model demonstration of a basic drive versus feed-forward control (this invention). The x-axis 1710, 1760 are unitless scale values. The y-axes 1720, 1770 are unitless scale values. The curved plot lines 1740, 1790 represent the motion of the system and the straight plot lines 1730, 1780 are the drive. Vertical lines denote resonant periods of the model system. The system has a rise-time of about 5 cycles. The numbers above the curves are the input amplitude and phase and the lower numbers are the resulting output amplitude and phase. In FIG. 17A, the drive is only related to the input and the straight plot lines 1730 are the same every cycle. In FIG. 17B, the drive uses information about the history of the transducer drive and drives in such a way to both drive harder (at the start) and drive in such a say to damp the motion (at the end). This results in output closer to the input at all points in the control period.

Figure 18:
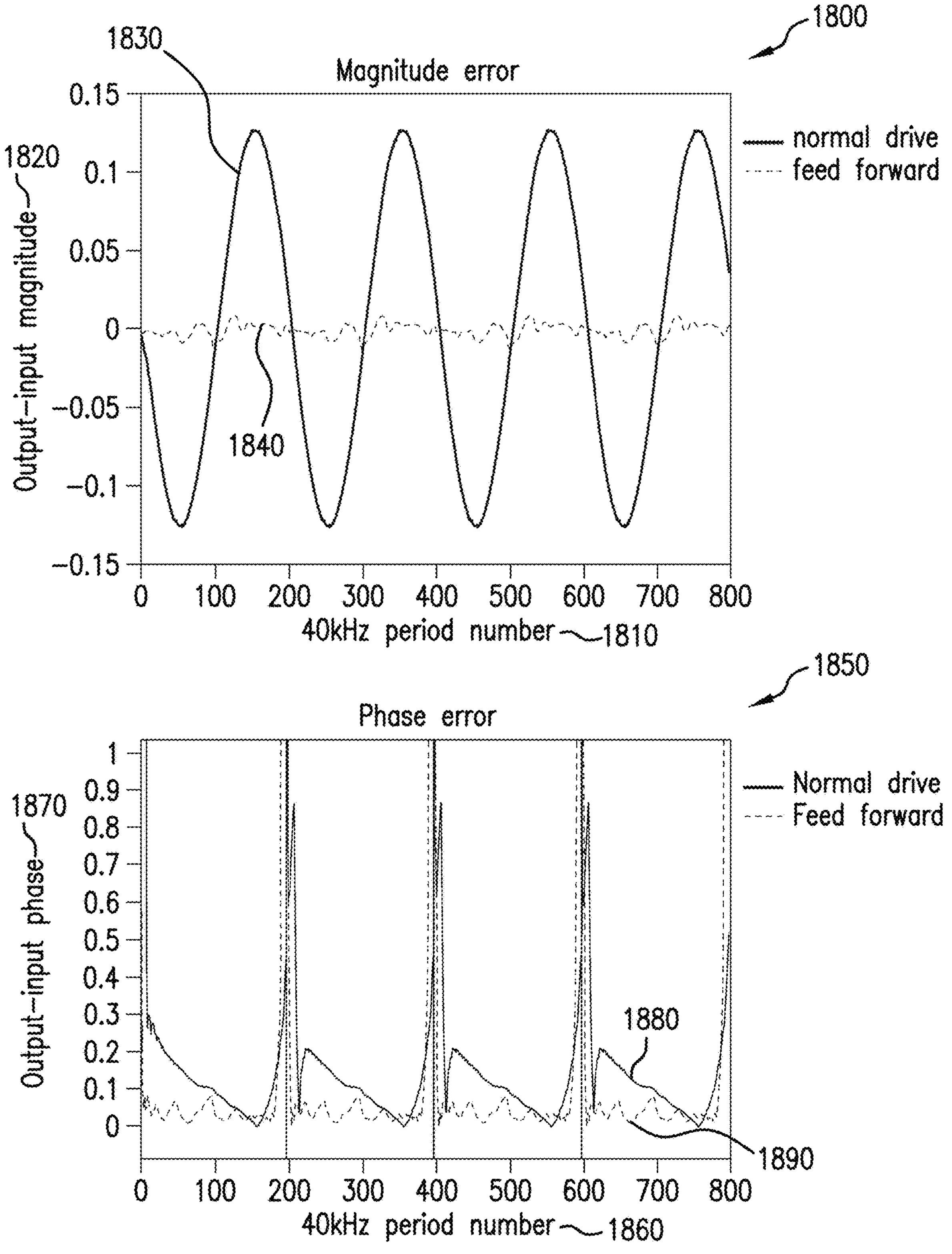
FIG. 18 shows graphs of amplitude and phase accuracy of amplitude-modulated input using regular and feed-forward drive.

FIG. 18 show a pair of graphs 1800, 1850 showing amplitude and phase accuracy of amplitude-modulated input using regular and feed-forward drive applied to a real-world 40 kHz transducer model. The x-axes 1810, 1860 are the 40 kHz period number. The y-axis 1820 of the first graph 1800 is output-input magnitude. The y-axis 1870 of the second graph 1850 is output-input phase. The plot shows normal 1830, 1880 and feed forward 1840, 1890 drive. The feed-forward system in all the simulations presented here uses 60 terms in the impulse response. Amplitude modulation desired is 200 Hz and full modulation amplitude. Input coefficients are converted to a PWM signal with 100 steps per period to simulate real-world digital drive. The first graph 1800 shows the difference of the output to input over 800 periods. The second graph 1850 shows the difference in phase between the output to input. The feed-forward control 1890 is able to hold the system to better than 2% amplitude accuracy and less than 0.1 radians except near zeros of the amplitude. By comparison, the traditional drive 1880 has more than 10% amplitude error and drifts up to 0.3 radians off target even at non-zero amplitudes.

Figure 19:
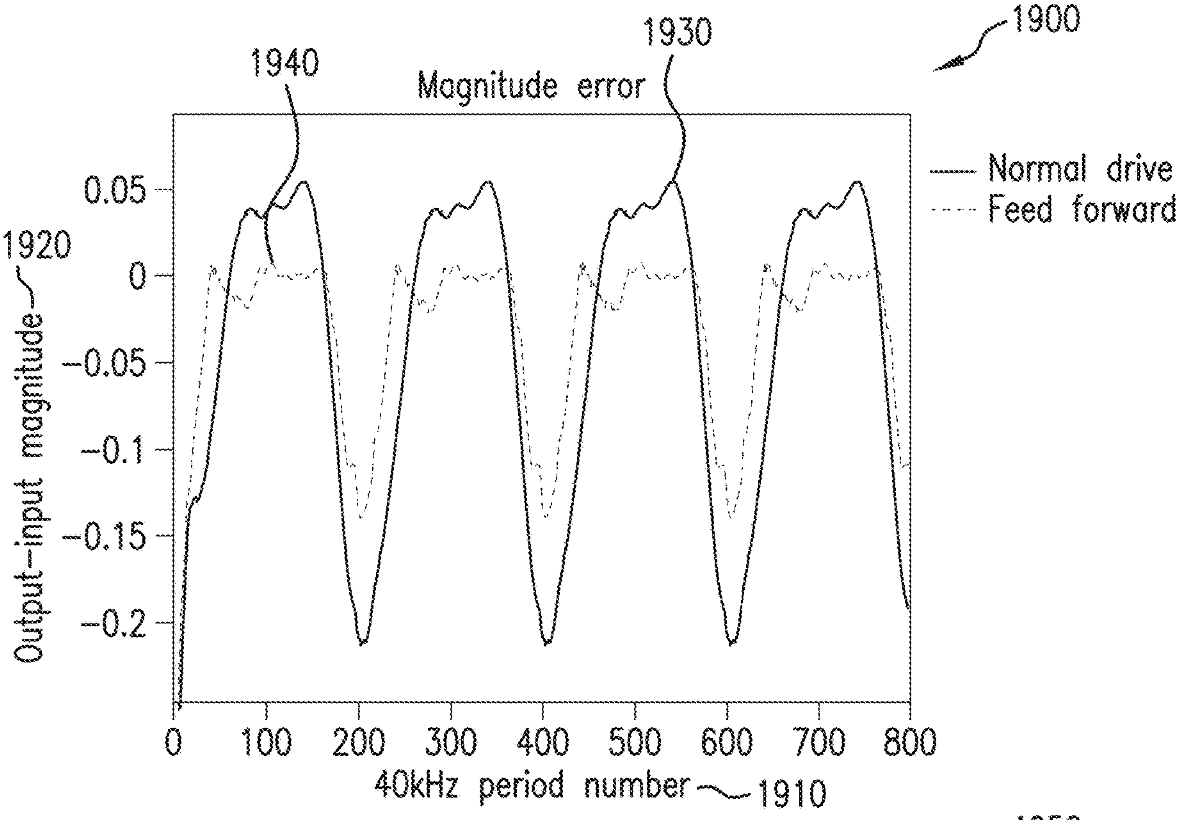
FIG. 19 shows graphs of amplitude and phase accuracy of phase-modulated input using regular and feed-forward drive.
Figure 19:
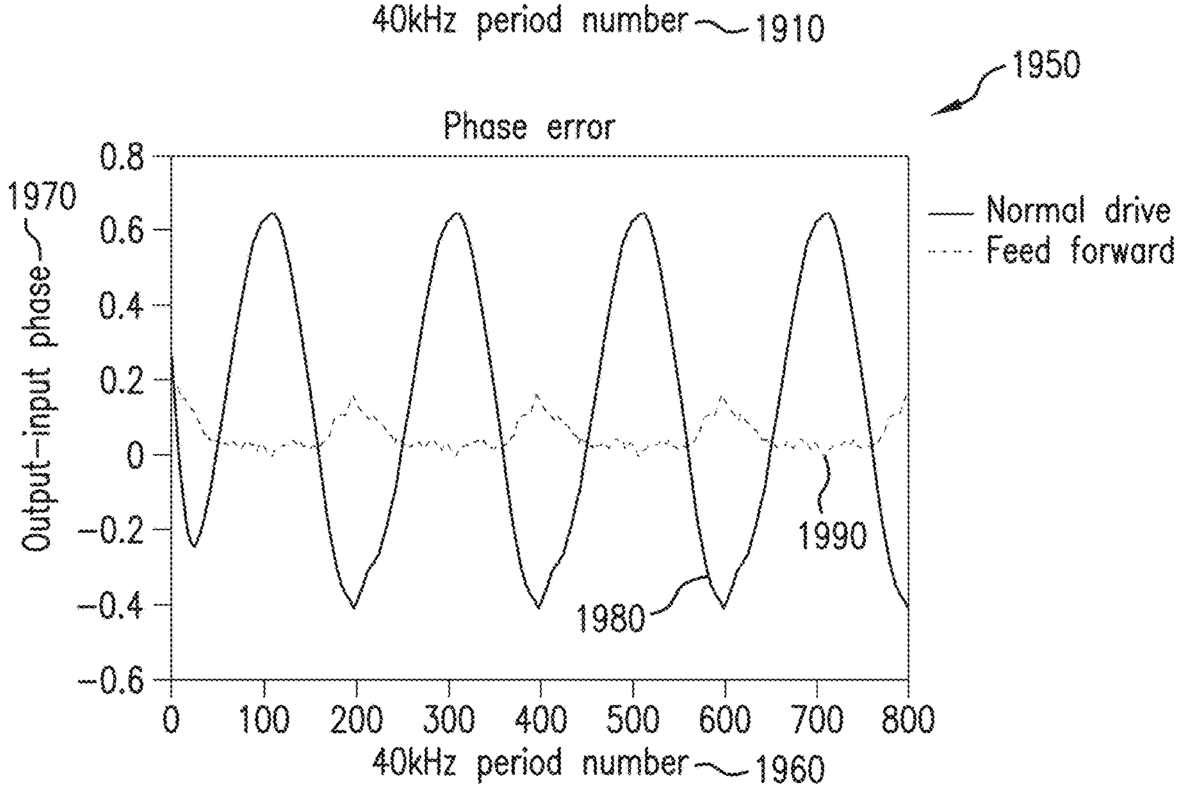

FIG. 19 shows graphs 1900, 1950 of amplitude and phase accuracy of phase-modulated input using regular and feed-forward drive applied to a real-world 40 kHz transducer model. The x-axes 1910, 1960 are the 40 kHz period number. The y-axis 1920 of the first graph 1900 is output-input magnitude. The y-axis 1970 of the second graph 1950 is output-input phase. The plot shows normal 1930, 1980 and feed forward 1940, 1990 drive. The input drive is 90% amplitude and 0.7*pi radians amplitude at 200 Hz. In this case, the transducer is physically not capable of following the requested phase shift as neither system is able to fully match both the amplitude and phase of the requested input. Comparing the two, it is clear that when the request is physically possible (near periods 100, 300, 500, 700) the feed-forward system is able to hold both the phase and amplitude with only a few percent error. When the system does deviate and the errors are significant, the feed-forward system is able to recover faster and even when amplitude dips, is able to keep phase closer to request compared to a traditional drive system.

Figure 20A:
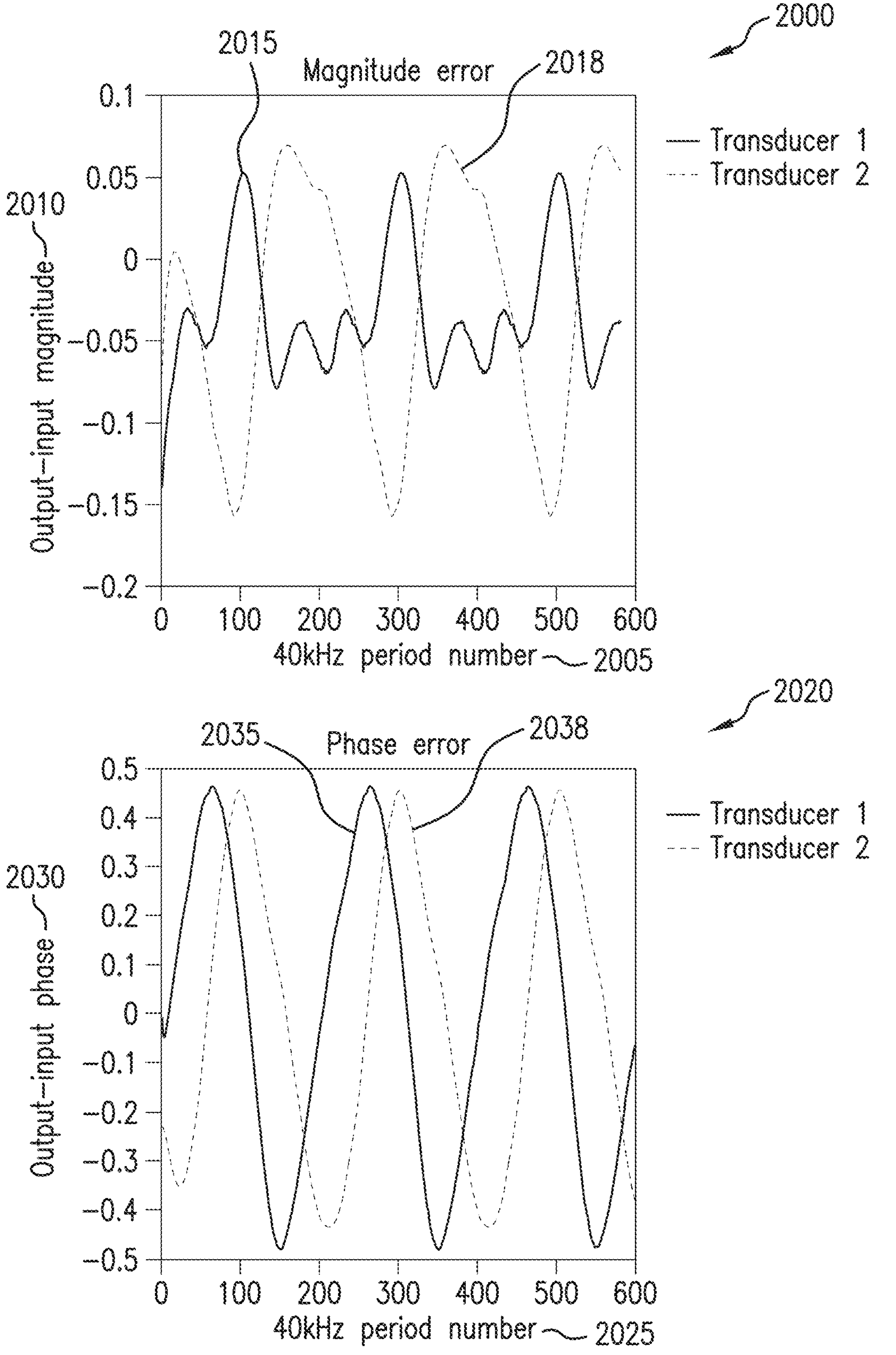
FIGS. 20A and 20B show graphs of cross-talk performance.
Figure 20B:
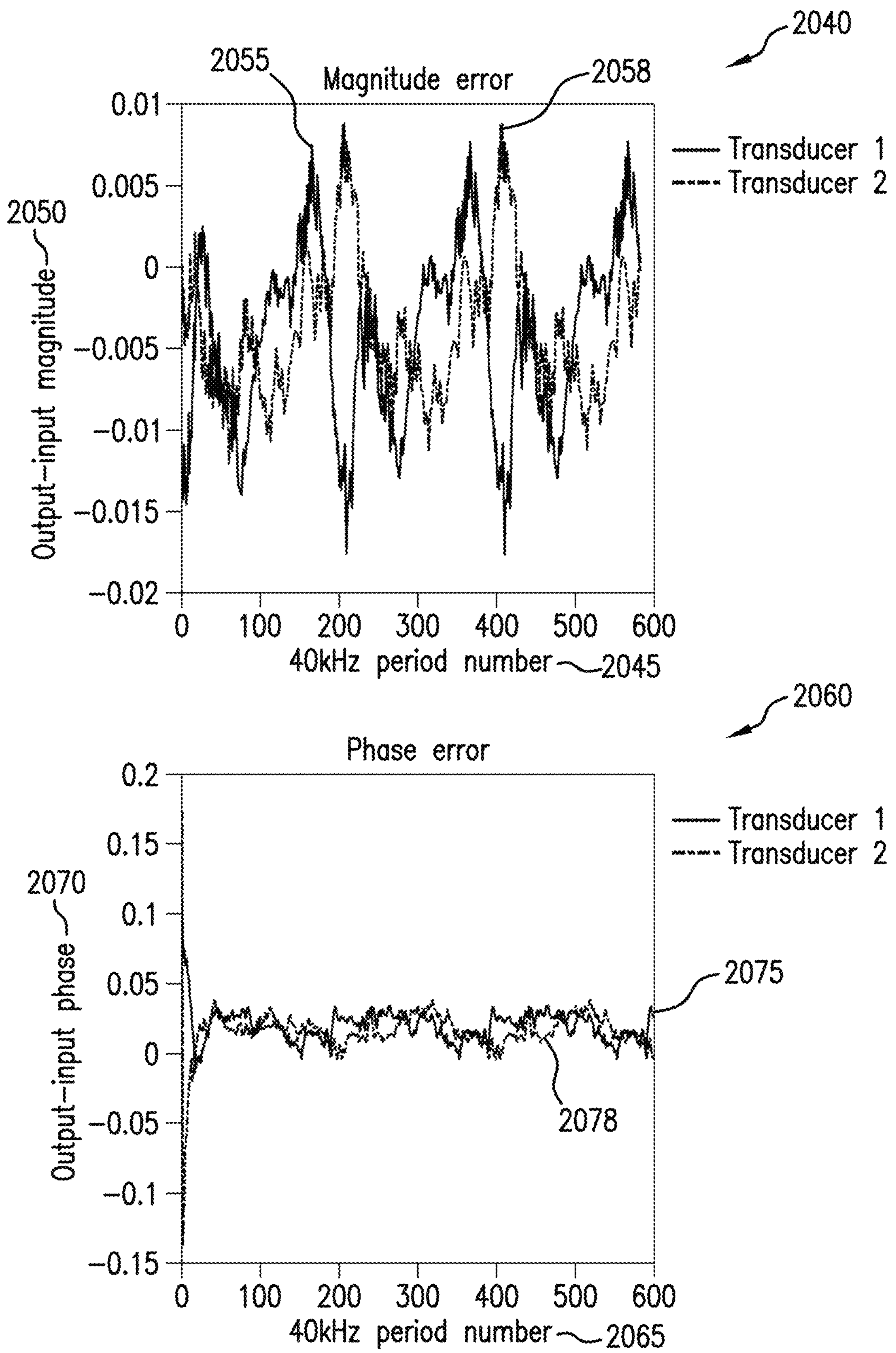

FIG. 20A are graphs 2000, 2020 that use regular drive FIG. 20B are graphs 2040, 2060 that use feed-forward drive. The x-axes 2005, 2025, 2045, 2065 are the 40 kHz period number. The y-axes 2010, 2050 for the magnitude error graphs 2000, 2040 are output-input magnitude. The y-axes 2030, 2070 for the phase error graphs 2020, 2060 are output-input phase. The plots show results for transducer 1 2015, 2035, 2055, 2075 and for transducer 2 2018, 2038, 2058, 2078.

These graphs are examples of cross-talk performance showing amplitude and phase accuracy of two strongly-coupled phase-modulated transducers with transducer 2 at 90 degrees out of phase with transducer 1. The mathematical model uses the same real-world 40 kHz transducer model as the previous figures with an added coupling losses spring. Input coefficients are converted to a PWM signal with 100 steps per period to emulate real-world digital drive. The input drive is 80% amplitude with 0.5*pi radians of modulation at 200 Hz, with transducer 2 at 90 degrees out of phase with transducer 1. The graphs 2000, 2020 show the large errors introduced by coupling with the amplitude dropping by as much as 15%. The graphs 2040, 2060 show the control possible with feed-forward coupled control, with amplitude and phase accuracy on the order of 2%.

Figure 21A:
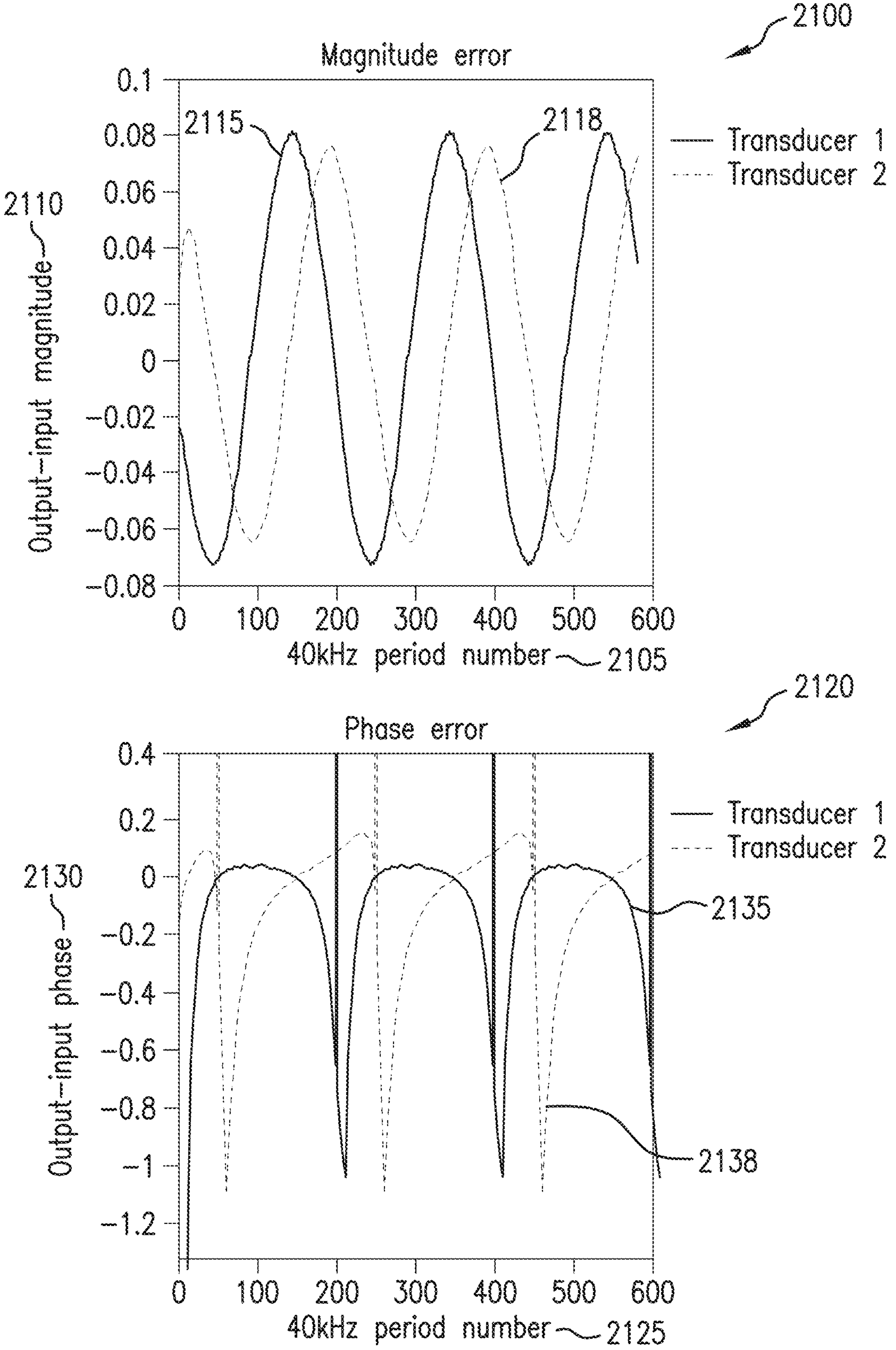
FIGS. 21A and 21B show graphs of amplitude and phase accuracy.
Figure 21B:
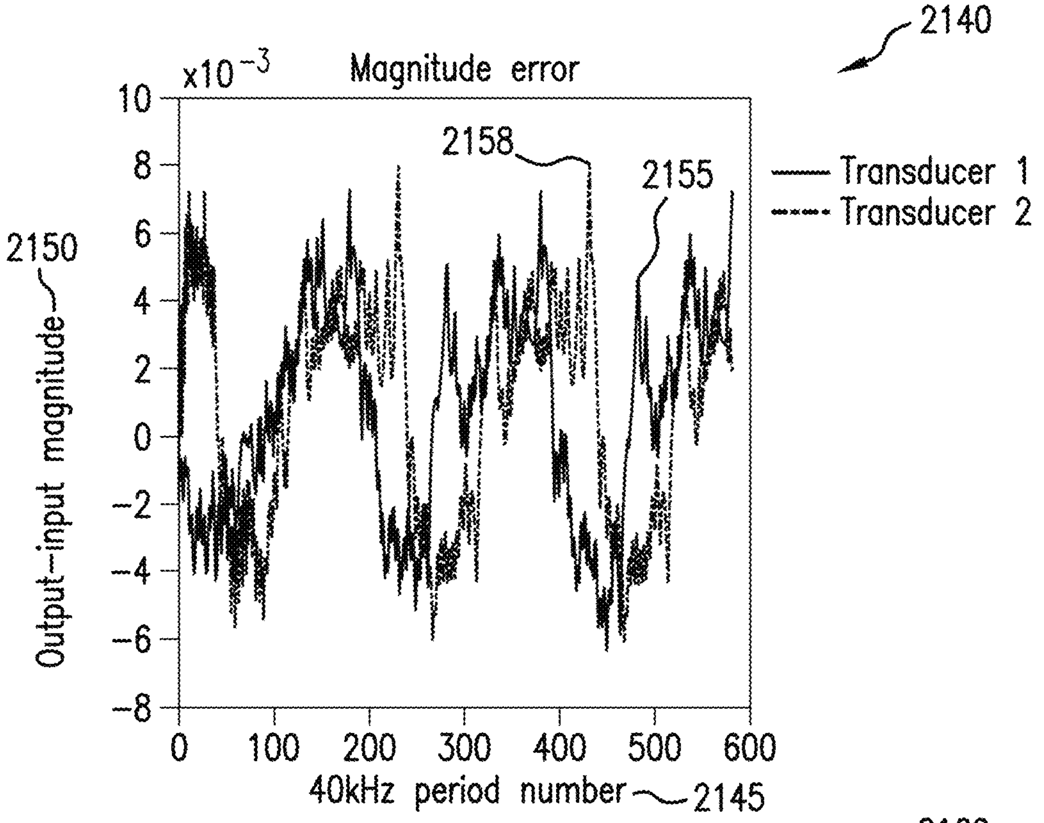
Figure 21B:
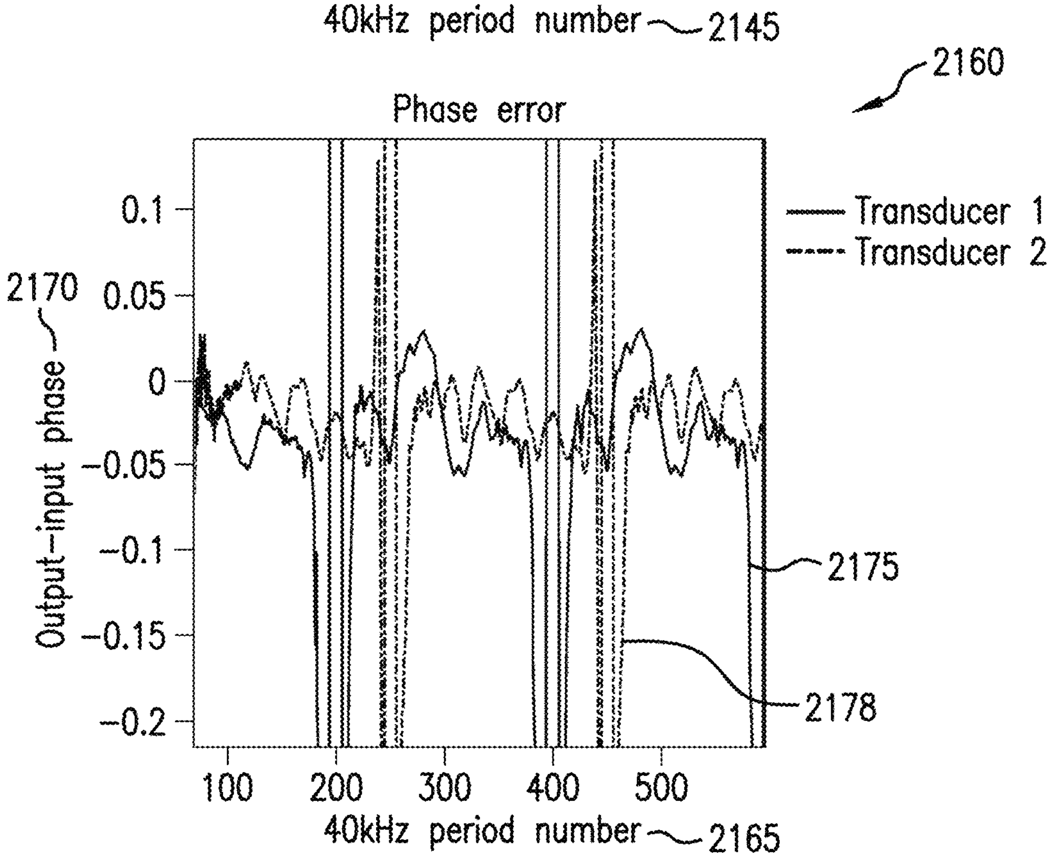

FIG. 21A are graphs 2100, 2120 that use regular drive FIG. 20B are graphs 2140, 2160 that use feed-forward drive. The x-axes 2105, 2125, 2145, 2165 are the 40 kHz period number. The y-axes 2110, 2150 for the magnitude error graphs 2100, 2140 are output-input magnitude. The y-axes 2130, 2170 for the phase error graphs 2120, 2160 are output-input phase. The plots show results for transducer 1 2115, 2135, 2155, 2175 and for transducer 2 2118, 2138, 2158, 2178.

The mathematical model uses the same real-world 40 kHz transducer model as the previous figures with an added coupling losses spring. Input coefficients are converted to a PWM signal with 100 steps per period to simulate real-world digital drive. The input drive is 50% amplitude depth at 200 Hz, with transducer 2 at 90 degrees out of phase with transducer 1. The graphs 2100, 2120 show the large errors introduced by coupling: the amplitude is out of phase with drive input in graph 2100 and causes massive phase errors in graph 2120. The graphs 2150, 2170 show the control possible with feed-forward coupled control, with amplitude accuracy better than 1% in graph 2140 and phase under tight control except near zero-output in graph 2160.

Figure 22:
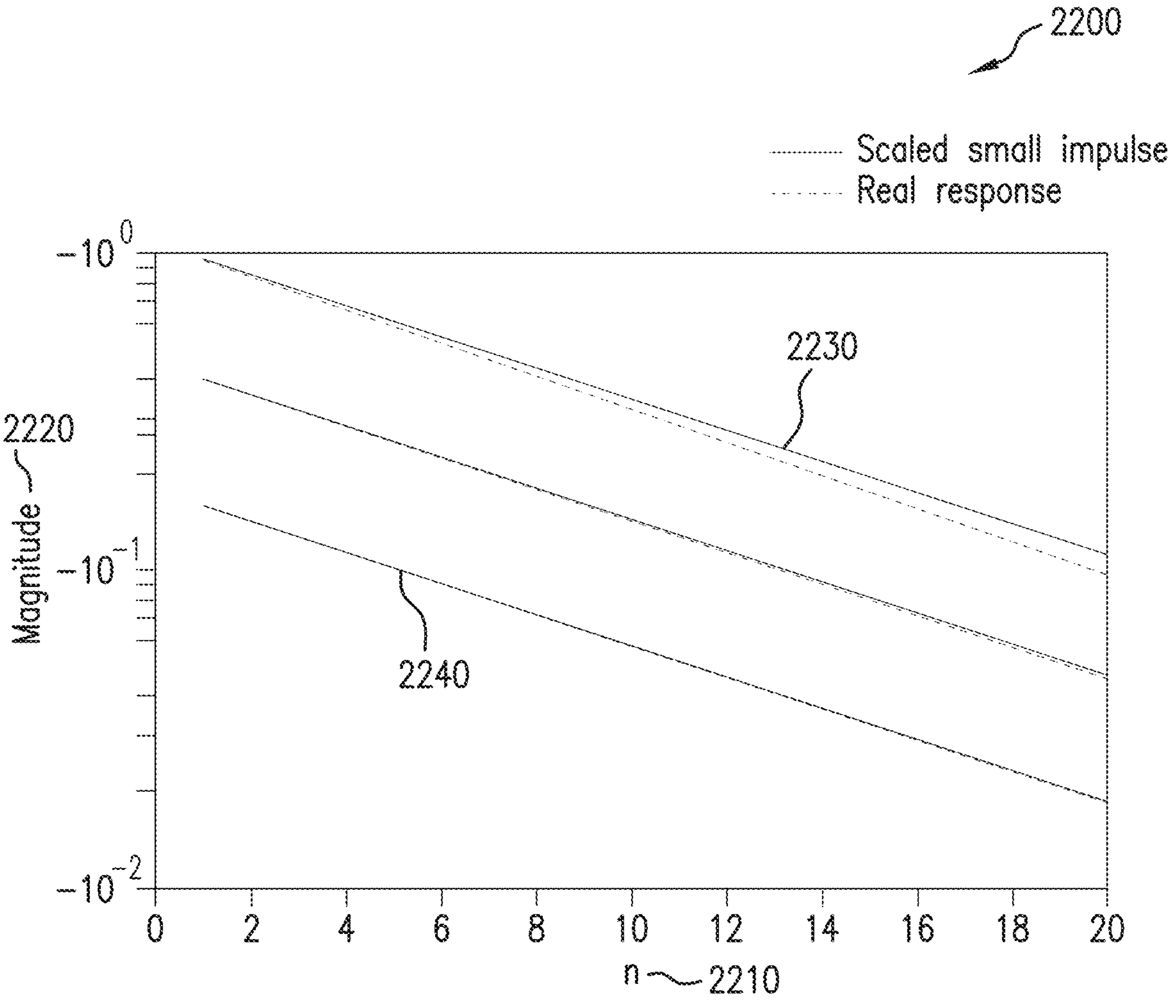
FIG. 22 shows a graph of simulations of a nonlinear response.

FIG. 22 shows a graph 2200 of simulations of a nonlinear response for impulse response amplitude of a standard damped oscillator and a damped harmonic oscillator with a nonlinear damping term. The x-axis 2210 is n. The y-axis 2220 is magnitude. The plots 2230, 2240 represent the amplitude decay of a resonant system starting at the amplitude given at the start of the curve (x-axis 2210 value 1). The scaled small impulse plot 2230 show a response where decay is exponential (simply proportional to amplitude) and hence is a straight line on a semi-log plot which is expected from a simple damped oscillator. In this case the impulse response can simply be scaled by the starting value. The real response plot 2240 show the response of a nonlinear system where the decay of the amplitude is a stronger with higher amplitude and thus deviates more from the simple system when drive is high. The method presented in equation 2 uses the full range of impulse response curves produced by different starting amplitudes to work out a correct historical term and more accurately drive the system.

Figure 23:
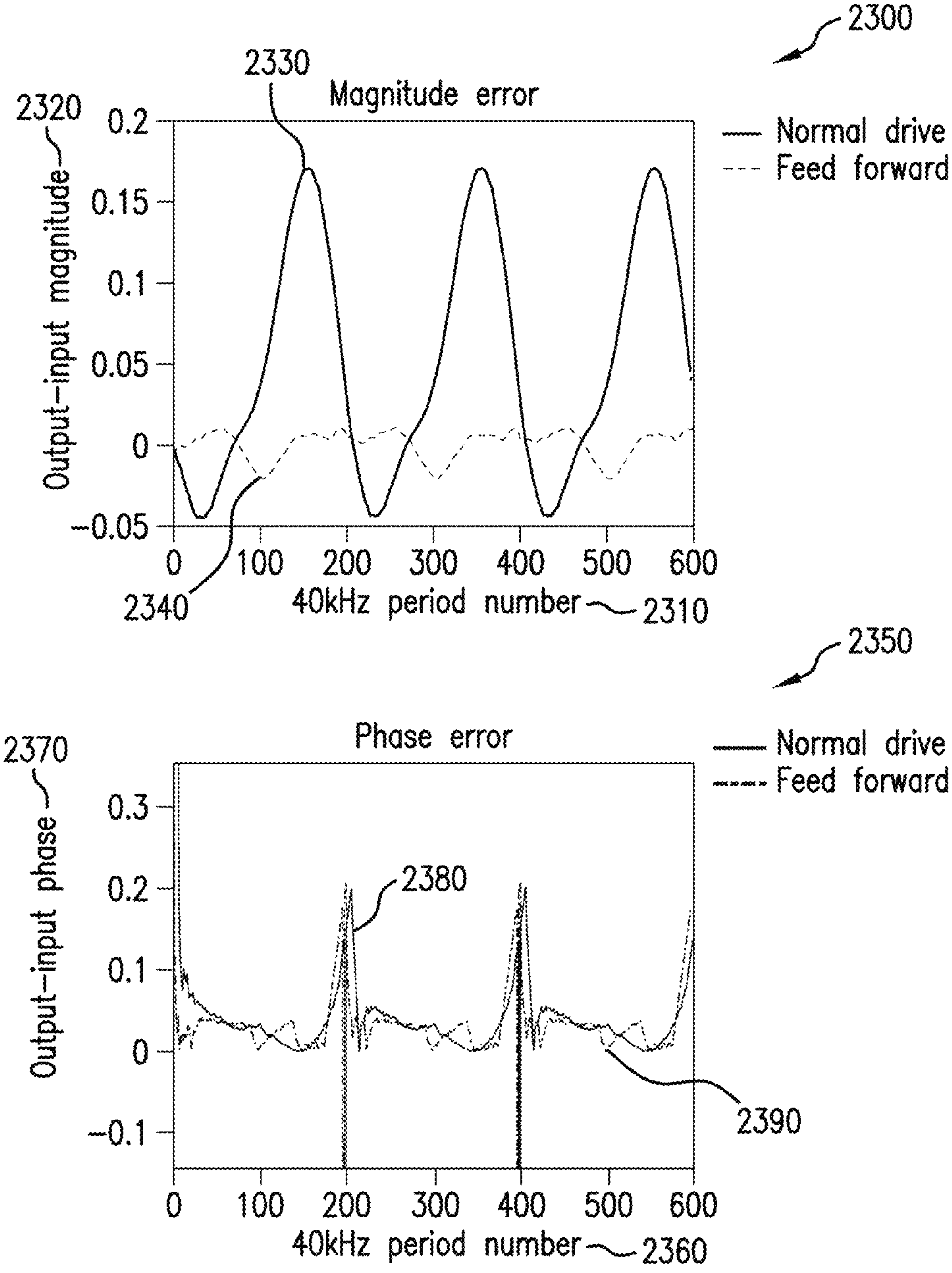
FIG. 23 shows graphs of amplitude and phase accuracy.

FIG. 23 show graphs 2300, 2350 of amplitude and phase accuracy of amplitude-modulated input using regular and feed-forward drive applied to a real-world 40 kHz transducer model including a nonlinear damping term. The x-axes 2310, 2360 are the 40 kHz period number. The y-axis 2320 of the first graph 2300 is output-input magnitude. The y-axis 2370 of the second graph 2350 is output-input phase. The plot shows normal 2330, 2380 and feed forward 2340, 2390 drive. Amplitude modulation desired is 200 Hz and full modulation amplitude. Input coefficients are converted to a PWM signal with 100 steps per period to simulate real-world digital drive. In the case of the normal drive, the input amplitude is adjusted to match the nonlinear response curve in the steady state, and this corrected response is what is used to calculate the difference from output. In the case of the feed-forward control, the input signal was scaled so that an input of 1 corresponded to the maximum the transducer model was capable of producing (in this case —0.77). Information regarding the shape of the nonlinearity is contained in the impulse response functions and will automatically fix the curve shape. As with linear systems, the feed-forward control is able to control the system with better accuracy than traditional methods.

II. Additional Disclosure

There is quite a bit of text spent comparing the feed-forward method to current (steady-state) methods.

Feedback control designs require sampling at the system which increases cost and complexity.

One inventive step lies in recognizing that the impulse response for a highly-resonant system can be approximated by Fourier components at the resonant frequency (equation 2). This key simplification reduces the deconvolution operator to matrix algebra. Beyond this, manipulating the impulse response to be a function of drive amplitude to compensate for amplitude non-linearities is novel. Also, adapting this to a coupled resonant-system array and solving for the necessary drive as a matrix inversion is new.

Additional disclosure is as follows:

15. A method comprising:

generating a drive amplitude and phase of a resonant system to substantially realize a desired drive amplitudes and phases, wherein the resonant system comprises an impulse response of the resonant system, a history of drive phases and amplitudes, and a desired output; reducing the impulse response to Fourier components at the resonant system's resonant frequency to create a reduced-form impulse response;

using the reduced-form impulse response and the history of drive phases and amplitudes to create a predicted current state of the resonant system;

using the reduced-form impulse response, the predicted current state of the resonant system, and the desired output to generate a final drive amplitude and a final phase.

16. The method as in claim 15, wherein the impulse response used changes in response to at least one of historical drive data, predicted drive data, temperature, age, altitude, external sensors and simulations.

17. The method as in claim 15, wherein the reduced-form impulse response, the predicted current state of the resonant system, and the desired output to generate the final drive amplitude and the final phase using an equation:

$$D_0=(V_0-(D\cdot h))/h_0;$$

where $V_0$ represents desired output, $D_0$ represents calculated final amplitude and phase, $h_0$ represents a first-period impulse response Fourier component, D is a vector containing time-shifted historical driving values, and h is a second vector containing time-shifted impulse response Fourier components.

18. The method as in claim 15, wherein the desired drive amplitudes and phases are filtered to reduce audio generation.

19. The method as in claim 15, wherein the final drive amplitude and the final drive phase is realized as a digital signal.

20. The method as in claim 15, wherein the final drive amplitude and the final drive phase is realized as an analog signal.

21. The method as in claim 15, wherein the impulse response is computed recursively, subject to a limit.

22. The method as in claim 15, wherein the resonant system measures the impulse response occasionally to adjust stored values.

23. The method as in claim 15, wherein the resonant system comprises multiple sub-elements, each which are individually addressed.

24. The method as in claim 23, wherein the resonant system comprises:

an array composed of impulse responses of coupled sub-elements;

the history of drive phases and amplitudes is a list of historical drive signals to each of the coupled sub-elements;

the desired output is a list of desired outputs for each of the coupled sub-elements; and the desired drive amplitude and phase is a list of outputs for each of the sub-elements.

25. The method as in claim 24, wherein an array of the reduced-form impulse response Fourier components, a first list of the predicted current states of each sub-element, and a second list of the desired output of each sub-element generate a third list of the calculated drive amplitudes and phases using an equation:

$$D_0 = h_0^{-1}\left(V - (h_1 h_2 \cdots h_n)\begin{pmatrix} D_1 \\ D_2 \\ \vdots \\ D_n \end{pmatrix}\right);$$

where $$V = \begin{pmatrix} V_1 \\ \vdots \\ V_m \end{pmatrix},$$

$$h_n = \begin{pmatrix} h_{11n} & h_{21n} & \cdots & h_{m1n} \\ h_{21n} & h_{22n} & \ddots & \vdots \\ \vdots & \ddots & \ddots & \vdots \\ h_{m1n} & \cdots & \cdots & h_{mmn} \end{pmatrix},$$

$$D_n = \begin{pmatrix} D_{1n} \\ \vdots \\ D_{mn} \end{pmatrix},$$

n represents a given period delay offset, numbered indexes in $$h_n = \begin{pmatrix} h_{11n} & h_{21n} & \cdots & h_{m1n} \\ h_{21n} & h_{22n} & \ddots & \vdots \\ \vdots & \ddots & \ddots & \vdots \\ h_{m1n} & \cdots & \cdots & h_{mmn} \end{pmatrix}$$

are impulse response Fourier components on a sub-element specified by the second number when a sub-element represented by the first number is driven and $h_0^{-1}$ is an inverse of the first-cycle matrix of the impulse response array; $D_n$ is the time-shifted historical drive values for each of m sub-elements; and wherein an output of the equation ($D_0$) is a list of driving coefficients form sub-elements given a desired m outputs in V.

(3). Conclusion

While the foregoing descriptions disclose specific values, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method comprising:

generating a drive amplitude and phase of a resonant system to substantially realize a desired drive amplitudes and phases, wherein the resonant system comprises an impulse response of the resonant system, a history of drive phases and amplitudes, and a desired output;

reducing the impulse response to Fourier components at the resonant system's resonant frequency to create a reduced-form impulse response;

using the reduced-form impulse response and the history of drive phases and amplitudes to create a predicted current state of the resonant system;

using the reduced-form impulse response, the predicted current state of the resonant system, and the desired output to generate a final drive amplitude and a final phase.

2. The method as in claim 1, wherein the impulse response used changes in response to at least one of historical drive data, predicted drive data, temperature, age, altitude, external sensors and simulations.

3. The method as in claim 1, wherein the reduced-form impulse response, the predicted current state of the resonant system, and the desired output to generate the final drive amplitude and the final phase using an equation:

$$D_0=(V_0-(D\cdot h))/h_0;$$

where $V_0$ represents desired output, $D_0$ represents calculated final amplitude and phase, $h_0$ represents a first-period impulse response Fourier component, Dis a vector containing time-shifted historical driving values, and his a second vector containing time-shifted impulse response Fourier components.

4. The method as in claim 1, wherein the desired drive amplitudes and phases are filtered to reduce audio generation.

5. The method as in claim 1, wherein the final drive amplitude and the final drive phase is realized as a digital signal.

6. The method as in claim 1, wherein the final drive amplitude and the final drive phase is realized as an analog signal.

7. The method as in claim 1, wherein the impulse response is computed recursively, subject to a limit.

8. The method as in claim 1, wherein the resonant system measures the impulse response occasionally to adjust stored values.

9. The method as in claim 1, wherein the resonant system comprises multiple sub-elements, each which are individually addressed.

10. The method as in claim 9, wherein the resonant system comprises:

an array composed of impulse responses of coupled sub-elements;

the history of drive phases and amplitudes is a list of historical drive signals to each of the coupled sub-elements;

the desired output is a list of desired outputs for each of the coupled sub-elements; and the desired drive amplitude and phase is a list of outputs for each of the sub-elements.

11. The method as in claim 10, wherein an array of the reduced-form impulse response Fourier components, a first list of the predicted current states of each sub-element, and a second list of the desired output of each sub-element generate a third list of the calculated drive amplitudes and phases using an equation:

$$D_0 = h_0^{-1}\left(V - \begin{pmatrix} h_1 h_2 & \cdots & h_n \end{pmatrix}\begin{pmatrix} D_1 \\ D_2 \\ \vdots \\ D_n \end{pmatrix}\right);$$

where $$V = \begin{pmatrix} V_1 \\ \vdots \\ V_m \end{pmatrix},$$

$$h_n = \begin{pmatrix} h_{11n} & h_{21n} & \cdots & h_{m1n} \\ h_{21n} & h_{22n} & \ddots & \vdots \\ \vdots & \ddots & \ddots & \vdots \\ h_{m1n} & \cdots & \cdots & h_{mmn} \end{pmatrix},$$

$$D_n = \begin{pmatrix} D_{1n} \\ \vdots \\ D_{mn} \end{pmatrix},$$

n represents a given period delay offset, numbered indexes in $$h_n = \begin{pmatrix} h_{11n} & h_{21n} & \cdots & h_{m1n} \\ h_{21n} & h_{22n} & \ddots & \vdots \\ \vdots & \ddots & \ddots & \vdots \\ h_{m1n} & \cdots & \cdots & h_{mmn} \end{pmatrix}$$

are impulse response Fourier components on a sub-element specified by the second number when a sub-element represented by the first number is driven and $h_0^{-1}$ is an inverse of the first-cycle matrix of the impulse response array; $D_n$ is the time-shifted historical drive values for each of m sub-elements; and wherein an output of the equation ($D_0$) is a list of driving coefficients for m sub-elements given a desired m outputs in V.

* * * * *